United States Patent
Aoki et al.

(10) Patent No.: US 9,707,743 B2
(45) Date of Patent: Jul. 18, 2017

(54) METHOD OF MANUFACTURING ELECTROPHORESIS PARTICLES, ELECTROPHORESIS PARTICLES, ELECTROPHORESIS DISPERSION LIQUID, ELECTROPHORESIS SHEET, ELECTROPHORESIS DEVICE, AND ELECTRONIC APPARATUS

(71) Applicant: Seiko Epson Corporation, Tokyo (JP)

(72) Inventors: Takashi Aoki, Higashiura-cho (JP); Shinobu Yokokawa, Okaya-shi (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 14/609,797

(22) Filed: Jan. 30, 2015

(65) Prior Publication Data
US 2015/0232701 A1 Aug. 20, 2015

(30) Foreign Application Priority Data
Feb. 18, 2014 (JP) .................. 2014-028865

(51) Int. Cl.
| | |
|---|---|
| *B32B 27/14* | (2006.01) |
| *C09D 183/10* | (2006.01) |
| *B32B 27/30* | (2006.01) |
| *B32B 27/08* | (2006.01) |
| *C08G 77/442* | (2006.01) |
| *G02F 1/167* | (2006.01) |
| *C08G 77/20* | (2006.01) |
| *C08L 83/10* | (2006.01) |

(52) U.S. Cl.
CPC .............. *B32B 27/14* (2013.01); *B32B 27/08* (2013.01); *B32B 27/30* (2013.01); *B32B 27/308* (2013.01); *C08G 77/442* (2013.01); *C09D 183/10* (2013.01); *B32B 2307/202* (2013.01); *B32B 2307/21* (2013.01); *C08G 77/20* (2013.01); *C08L 83/10* (2013.01); *G02F 2001/1678* (2013.01)

(58) Field of Classification Search
CPC ......... B32B 27/00; B32B 27/08; B32B 27/14; B32B 27/30; B32B 27/308; B32B 2307/202; B32B 2307/21
USPC .................................. 523/203; 428/403, 407
See application file for complete search history.

(56) References Cited

U.S. PATENT DOCUMENTS

| | | | |
|---|---|---|---|
| 7,880,955 B2 * | 2/2011 | Naijo ...................... | G02F 1/167 345/107 |
| 2011/0281103 A1 * | 11/2011 | Zhou ...................... | B82Y 30/00 428/323 |
| 2012/0329940 A1 * | 12/2012 | Shimanaka ............... | C09C 3/12 524/547 |

FOREIGN PATENT DOCUMENTS

JP 2013-156381 A 8/2013

* cited by examiner

*Primary Examiner* — Marc Zimmer
(74) *Attorney, Agent, or Firm* — ALG Intellectual Property, LLC

(57) ABSTRACT

A method of manufacturing electrophoresis particles having base particles exposing first functional groups on surfaces and block copolymers bonded to the base particles, the method including: obtaining the plurality of block copolymers in which dispersion portions formed by polymerizing monomers including side chains contributing to dispersibility in a dispersion medium and bonding portions formed by polymerizing second monomers including second functional groups having reactivity with the first functional group are bonded, by living polymerization; and bonding the bonding portions to the base particles by reacting the first functional groups and the second functional groups so that the block copolymers are bonded to the base particles.

19 Claims, 7 Drawing Sheets

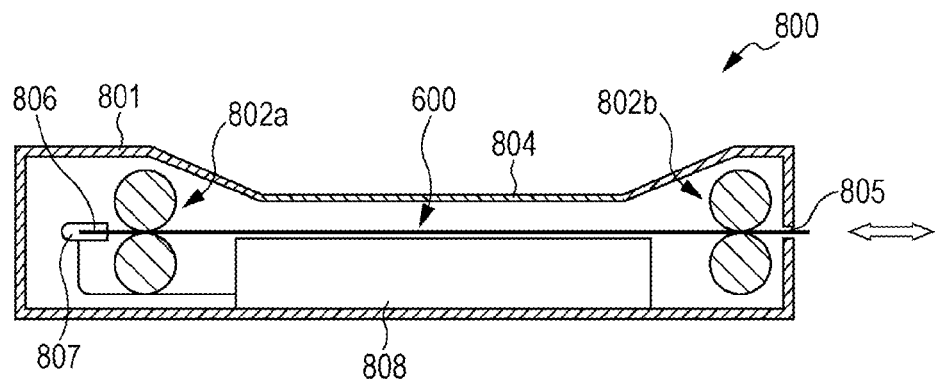
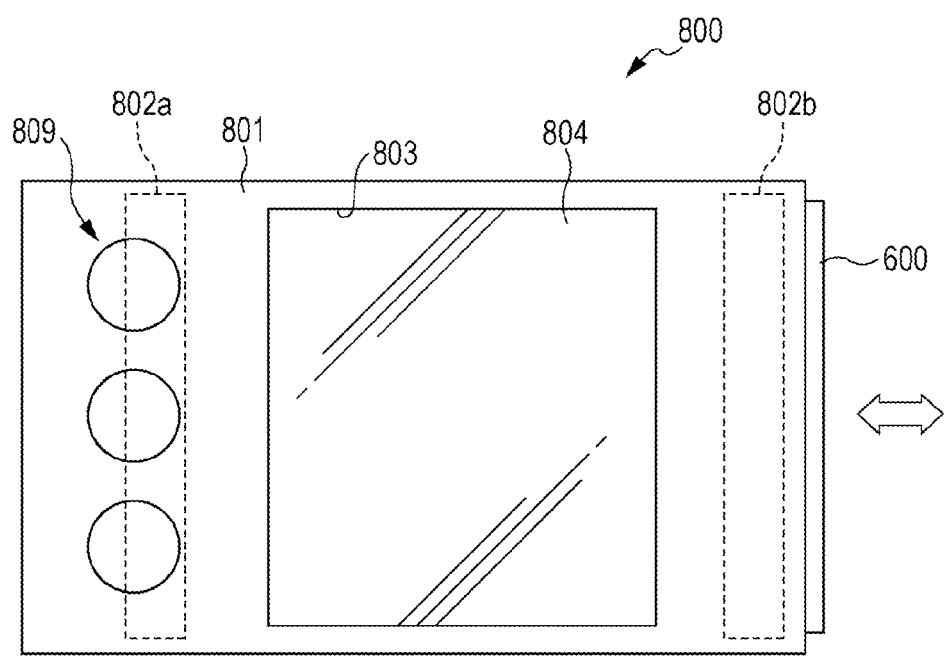

METHOD OF MANUFACTURING ELECTROPHORESIS PARTICLES, ELECTROPHORESIS PARTICLES, ELECTROPHORESIS DISPERSION LIQUID, ELECTROPHORESIS SHEET, ELECTROPHORESIS DEVICE, AND ELECTRONIC APPARATUS

BACKGROUND

1. Technical Field

The present invention relates to a method of electrophoresis particles, electrophoresis particles, electrophoresis dispersion liquid, an electrophoresis sheet, an electrophoresis device, and an electronic apparatus.

2. Related Art

In general, if an electric field is applied to a dispersion system in which fine particles are dispersed in liquid, the fine particles move (migrate) in the liquid by Coulomb's force. This phenomenon is called electrophoresis, and recently there has been attention to an electrophoresis display device that displays desired information (image) by using the electrophoresis, as a new display device.

The electrophoresis display device has a characteristic of maintaining display in a state of the application of a voltage is stopped, having a wide viewing angle, performing display at high contrast with low power consumption, and the like.

In addition, since the electrophoresis display device is a non-light emitting-type device, it is friendly to eyes compared with light emitting-type devices such as a cathode-ray tube.

Such an electrophoresis display device is known for including liquid in which electrophoresis particles are dispersed in a solvent, as electrophoresis dispersion liquid provided between a pair of substrates including electrodes.

In the electrophoresis dispersion liquid configured as above, particles including positive charges and negative charges are used as the electrophoresis particles, and accordingly, desired information (image) can be displayed by applying a voltage between the pair of substrates (electrodes).

Here, as electrophoresis particles 501, particles including coating layers 503 in which macromolecules 533 are bonded to base particles 502 are used (see FIG. 7). According to the configuration of including the coating layers 503 (the macromolecules 533), the electrophoresis particles 501 can be dispersed and charged in the electrophoresis dispersion liquid.

In addition, the electrophoresis particles configured as described above are manufactured as described below, for example, by using an atom transfer radical polymerization reaction (ATRP).

That is, the base particles 502 are prepared, silane coupling agents 531 with polymerization initiation groups are bonded to the surfaces of the base particles 502, polymerization portions 532 in which monomers are polymerized by the living radical polymerization with the polymerization initiation groups as starting points are formed, and the macromolecules (polymers) 533 are provided so that the electrophoresis particles 501 to which characteristics such as electrostatic properties or dispersibility is applied are prepared (see JPA-2013-156381).

However, in the electrophoresis particles 501 manufactured by using the ATRP, the macromolecules 533 are generated by forming the polymerization portion 532 according to the polymerization of monomers with polymerization initiation groups included in the silane coupling agent boned to the surfaces of the base particles 502, as starting points. At this point, according to the concentration of the silane coupling agents which are bonded to the base particles 502, and the kind of monomers, molecular weights of the polymerization portions 532 in the generated macromolecules 533, that is, polymerization degrees of the monomers, have irregularities among adjacent polymerization portions in some cases.

Therefore, uniform dispersion properties may not be obtained among a plurality of electrophoresis particles included in the electrophoresis dispersion liquid.

SUMMARY

An advantage of some aspects of the invention is to provide method of manufacturing electrophoresis particles that can manufacture the electrophoresis particles exhibiting uniform dispersion properties in electrophoresis dispersion liquid, the electrophoresis particles exhibiting the function, the highly reliable electrophoresis dispersion liquid using the electrophoresis particles, an electrophoresis sheet, an electrophoresis device, and an electronic apparatus.

According to an aspect of the invention, there is provided a method of manufacturing electrophoresis particles including particles including first functional groups on surfaces and block copolymers bonded to the particles, the method including: obtaining the block copolymers in which dispersion portions formed by polymerizing first monomers including portions contributing to dispersibility in a dispersion medium and bonding portions formed by polymerizing second monomers including second functional groups having reactivity with the first functional group are bonded by living polymerization; and bonding the bonding portions to the particles by reacting the first functional groups and the second functional groups so that the block copolymers are bonded to the particles.

In this case, it is possible to manufacture electrophoresis particles that can exhibit the uniform dispersion properties in the electrophoresis dispersion liquid.

In the method of manufacturing electrophoresis particles according to the invention, it is preferable that in the obtaining of the block copolymers, after the first monomers are polymerized, the second monomers be polymerized, to obtain the block copolymers.

In this case, it is possible to manufacture electrophoresis particles that can exhibit the uniform dispersion properties in the electrophoresis dispersion liquid.

In the method of manufacturing electrophoresis particles according to the invention, it is preferable that in the obtaining of the block copolymers, after the second monomers are polymerized, the block copolymers be obtained by polymerizing the first monomers.

In this case, it is possible to manufacture electrophoresis particles that can exhibit the uniform dispersion properties in the electrophoresis dispersion liquid.

In the method of manufacturing electrophoresis particles according to the invention, it is preferable that the living polymerization be living radical polymerization.

In this case, it is possible to manufacture electrophoresis particles that can exhibit the uniform dispersion properties in the electrophoresis dispersion liquid.

In the method of manufacturing electrophoresis particles according to the invention, it is preferable that the living radical polymerization be reversible addition fragmentation chain-type transfer polymerization.

In this case, a metal catalyst is not used, and there is no concern of metal pollution. In addition, the polymerization at the time of the polymerization of the first monomers can be easily performed. Also, the molecular weight distribution in the dispersion portions can be more securely set to be equal to or less than 1.2.

In the method of manufacturing electrophoresis particles according to the invention, it is preferable that before the second monomers are polymerized, the dispersion portions be isolated and refined.

In this case, it is possible to obtain the more uniform and highly refined polymers.

According to another aspect of the invention, there are provided electrophoresis particles including: particles including first functional groups on surfaces; and block copolymers bonded to the particles, in which the block copolymers include dispersion portions formed by polymerizing first monomers including portions contributing to dispersibility in a dispersion medium and bonding portions formed by polymerizing second monomers including second functional groups having reactivity with the first functional group and bonded to the dispersion portions, the bonding portions are bonded to the particles in a plurality of portions by the reaction of the first functional groups and the second functional groups, and the plurality of block copolymers have molecular weight distributions with respect to the dispersion portions equal to or less than 1.2.

In this case, it is possible to cause electrophoresis particles 1 to exhibit the uniform dispersion properties in the electrophoresis dispersion liquid.

In the electrophoresis particles according to the invention, it is preferable that weight average molecular weights of the dispersion portions be in the range of 20,000 to 100,000.

In this case, it is possible to cause electrophoresis particles that can exhibit the excellent dispersion properties in the electrophoresis dispersion liquid.

In the electrophoresis particles according to the invention, it is preferable that the first monomers be silicone macromonomers expressed by Formula (I) below.

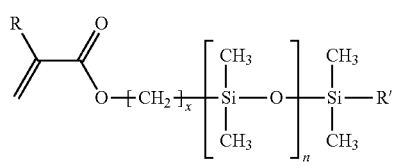

(I)

[in the formula, R is a hydrogen atom or methyl group, R' is a hydrogen atom or an alkyl group having 1 to 4 carbons, n is an integer equal to or greater than 0, and x is an integer from 1 to 3.]

In this case, as the dispersion medium included in the electrophoresis dispersion liquid described above, for example, when a dispersion medium including silicone oil as a main component is used, affinity of the first monomers to the dispersion medium is excellent. Therefore, the electrophoresis particles including the dispersion portions obtained by polymerizing the monomers M1 can be dispersed in the dispersion medium with excellent dispersibility.

In the electrophoresis particles according to the invention, it is preferable that molecular weights of the silicone macromonomers be in the range of 1,000 to 10,000.

In this case, the electrophoresis particles including the dispersion portions obtained by polymerizing the first monomers can be dispersed in the dispersion medium with excellent dispersibility.

In the electrophoresis particles according to the invention, it is preferable that in the dispersion portions, molecular weights of the first monomers on base end portion sides that are bonded to the bonding portions be smaller than molecular weights of the first monomers on distal end portion sides.

In this case, it is possible to manufacture electrophoresis particles that can exhibit the excellent dispersion properties in the electrophoresis dispersion liquid and also it is possible to bond dispersion portions to the surfaces of the base particles with high density.

In the electrophoresis particles according to the invention, it is preferable that the bonding portions each be formed by polymerizing the second monomers in the number of 2 to 8.

In this case, the bonding portions can be securely bonded to the surface of the base particle.

According to still another aspect of the invention, there is provided electrophoresis dispersion liquid including electrophoresis particles manufactured in the method of manufacturing electrophoresis particles according to the invention, or the electrophoresis particles according to the invention.

In this case, it is possible to cause electrophoresis dispersion liquid to include electrophoresis particles that exhibit the excellent dispersion properties.

According to still another aspect of the invention, there is provided an electrophoresis sheet including a substrate; and a plurality of structures that are positioned on an upper side of the substrate and store the electrophoresis dispersion liquid according to the invention.

In this case, it is possible to obtain a highly efficient and reliable electrophoresis sheet.

According to still another aspect of the invention, there is provided an electrophoresis device comprising the electrophoresis sheet according to the invention.

In this case, it is possible to obtain a highly efficient and reliable electrophoresis device.

According to still another aspect of the invention, there is provided an electronic apparatus comprising the electrophoresis device according to the invention.

In this case, it is possible to obtain a highly efficient and reliable electronic apparatus.

BRIEF DESCRIPTION OF THE DRAWINGS

The invention will be described with reference to the accompanying drawings, wherein like numbers reference like elements.

FIGS. 6A and 6B are diagrams illustrating an embodiment to which the electronic apparatus according to the invention is applied to the display.

DESCRIPTION OF EXEMPLARY EMBODIMENTS

Hereinafter, a method of manufacturing electrophoresis particles, an electrophoresis particle, electrophoresis dispersion liquid, an electrophoresis sheet, an electrophoresis device, and an electronic apparatus according to the invention are described in detail with reference to a preferred embodiment illustrated in the accompanying drawings.

Electrophoresis Particle

First, before describing the method of manufacturing electrophoresis particles according to the invention, an electrophoresis particle (electrophoresis particle according to the invention) manufactured by the method is described.

Figure 1:
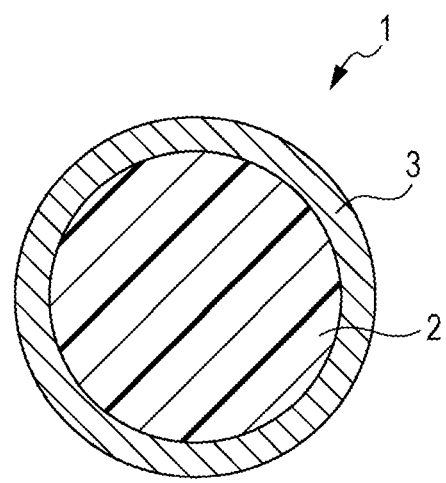
FIG. 1 is a vertical cross-sectional view illustrating an electrophoresis particle according to an embodiment of the invention.
Figure 2:
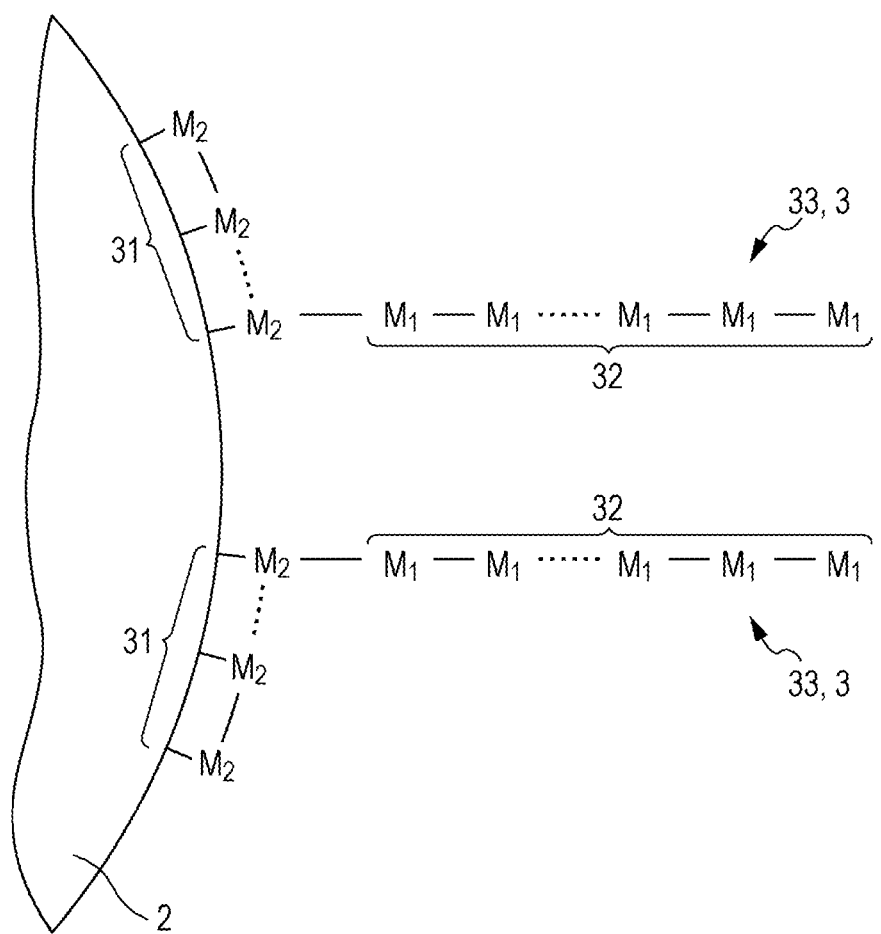
FIG. 2 is a diagram schematically illustrating a polymer including the electrophoresis particle illustrated in FIG. 1.

FIG. 1 is a vertical cross-sectional view illustrating an electrophoresis particle according to an embodiment of the invention, and FIG. 2 is a diagram schematically illustrating a polymer including the electrophoresis particle illustrated in FIG. 1.

An electrophoresis particle 1 includes a base particle (particle) 2, and a coating layer 3 provided on the surface of the base particle 2.

As the base particle 2, for example, at least one of a pigment particle, a resin particle, and a composite particle thereof is preferably used. These particles are easily manufactured.

As a pigment that configures the pigment particle, for example, a black pigment such as aniline black, carbon black, and titanium black, a white pigment such as titanium dioxide, antimony trioxide, barium sulfate, zinc sulfide, zinc ointment, and silicon oxide, a yellow pigment such as an azo-based pigment such as monoazo, disazo, and polyazo, isoindolinone, chrome yellow, yellow iron oxide, cadmium yellow, titanium yellow, and antimony, a red pigment such as an azo-based pigment such as monoazo, disazo, and polyazo, quinacridon red, and chrome vermilion, a blue pigment such as phthalocyanine blue, indusren blue, prussian blue, ultramarine, and cobalt blue, and a green pigment such as phthalocyanine green are included, and the pigments can be used singly or two or more kinds thereof may be used in combination.

In addition, as a resin material that configures the resin particle, for example, an acryl-based resin, a urethane-based resin, a urea-based resin, an epoxy-based resin, polystyrene, and polyester are included, and the resin materials can be used singly or two or more kinds thereof may be used in combination.

As the composite particle, for example, a particle obtained by performing a coating process by coating the surface of the pigment particle with a resin material, a particle obtained by performing a coating process by coating the surface of the resin particle with a pigment, and a particle configured with a mixture in which pigments and resin materials are mixed at a proper composition ratio are included.

The color of the electrophoresis particle 1 can be set as desired by appropriately selecting a kind of pigment particle, resin particle, and composite particle to be used as the base particle 2.

In addition, in the base particle 2, a first functional group that can be bonded to (react with) a second functional group included in a second monomer M2 (hereinafter, simply referred to as "monomer M2") included in a bonding portion 31 of a polymer 33 described below has to be included on (exposed to) the surface thereof. However, since the particle may not include a functional group depending on the kind of pigment particle, resin particle, and composite particle, in such a case, a functional group is introduced to the surface of the base particle 2, by performing a functional group introducing process such as an acid process, a base process, a UV process, an ozone process, and a plasma process, in advance.

In addition, the combination between the first functional group included on the surface of the base particle 2 and the second functional group included in the monomer M2 is not particularly limited as long as the first functional group and the second functional group can be bonded by the reaction therebetween. However, for example, a combination between an isocyanate group and a hydroxyl group or an amino group, a combination between an epoxy group, a glycidyl group, or an oxetane group and a carboxyl group, an amino group, a thiol group, a hydroxyl group, or an imidazole group, a combination between an amino group and a halogen group such as Cl, Br, and I, and a combination between an alkoxysilyl group and a hydroxyl group or an alkoxysilyl group are included. Among them, the combination in which the first functional group is the hydroxyl group and the second functional group is the alkoxysilyl group is preferable.

The base particle 2 and the monomer M2 having these combination are preferably used since they can be easily prepared, and the monomers M2 (block copolymer described below) can be strongly bonded to the surface of the base particle 2.

Therefore, herein below, the combination in which the first functional group included on the surface of the base particle 2 is a hydroxyl group and the second functional group included in the monomer M2 is an alkoxysilyl group is described as an example.

At least a portion of the base particle 2 (almost entire portion in illustrated configuration) is covered with the coating layer 3.

The coating layer 3 has a configuration in which a plurality of block copolymers 33 (hereinafter, simply referred to as "the polymers 33") are included (see FIG. 2). The block copolymer 33 includes a dispersion portion 32 and a bonding portion 31 bonded to the dispersion portion 32. The dispersion portion 32 is formed by polymerizing first monomers M1 (hereinafter, simply referred to as "monomers M1") having a part (group) that contributes to the dispersion property in the dispersion medium, and includes a plurality of units (hereinafter, also referred to as "dispersion units") derived from the monomers M1. The bonding portion 31 is formed by polymerizing the second monomers M2 including second functional groups having reactivity with the first functional groups on the surface of the base particle, and includes a plurality of units (hereinafter, also referred to as "bonding units") derived from the monomers M2. In the bonding portion 31, the base particle 2 and the block copolymer 33 are chemically bonded by causing the first functional group and the second functional group to react with each other. According to the invention, the molecular weight distribution of the dispersion portions 32 included in the plurality of polymers 33 is less than 1.2.

In electrophoresis dispersion liquid described below, the dispersion portions 32 is provided on the surface of the base particle 2 in the coating layer 3 in order to give dispersibility to the electrophoresis particles 1.

According to the invention, in the electrophoresis dispersion liquid, the dispersion portion 32 is formed by polymerizing the plurality of monomers M1 having a portion to be side chains that contribute to the dispersibility in the dispersion medium after the polymerization, and dispersion units derived from the monomers M1 are bonded in a plurality of portions. In addition, the molecular weight distribution of the dispersion portions 32 is equal to or less than 1.2.

The molecular weight distribution of the dispersion portions 32 indicates a ratio (Mw/Mn) between the number average molecular weight (Mn) of the dispersion portions 32 and the weight average molecular weight (Mw) of the dispersion portions 32. Since the molecular weight distribution of the dispersion portions 32 is equal to or less than 1.2, it is considered that the dispersion portions 32 exposed in the plurality of electrophoresis particles 1 have substantially the same lengths. Therefore, in the electrophoresis dispersion liquid, the respective electrophoresis particles 1 exhibit the even dispersion property. The number average molecular weight (Mn) or the weight average molecular weight (Mw) described above can be measured, for example, as the polystyrene conversion molecular weight by using a gel permeation chromatography (GPC) method.

The molecular weight distribution of the dispersion portions 32 may be equal to or less than 1.2, but is preferably equal to or less than 1.1, and more preferably equal to or less than 1.05. Accordingly, in the electrophoresis dispersion liquid, the respective electrophoresis particles 1 exhibit the more even dispersion property.

The monomers M1 are pendant-shaped monofunctional monomers including one polymerization group so that the monomers can be polymerized by living radical polymerization (radical polymerization), and further including portions to be nonionic side chains after the polymerization.

The dispersion portions 32 are formed by the living radical polymerization by using monomers including nonionic side chains as the monomers M1, and show excellent affinity with respect to the dispersion medium included in the electrophoresis dispersion liquid described below. Therefore, in the electrophoresis dispersion liquid, the electrophoresis particles 1 including the dispersion portions 32 described above are dispersed with excellent dispersibility without condensation.

In addition, as one polymerization group included in the monomers M1, for example, a polymerization group including a carbon-carbon double bond such as a vinyl group, a styryl group, and a (meth)acryloyl group is included.

As the monomers M1 described above, for example, a vinyl monomer, a vinyl ester monomer, a vinyl amide monomer, a (meth)acryl monomer, a (meth)acrylester monomer, a (meth)acrylamide monomer, and a styryl monomer are included, more specifically, an acrylic monomer such as 1-hexene, 1-heptene, 1-octene, methyl (meth)acrylate, ethyl (meth)acrylate, propyl (meth)acrylate, stearyl (meth)acrylate, lauryl (meth)acrylate, decyl (meth)acrylate, isooctyl (meth)acrylate, isobonyl (meth)acrylate, cyclohexyl (meth) acrylate, pentafluoro (meth)acrylate, and a silicone macromonomer expressed by General Formula (I) below, a styrene monomer such as styrene, 2-methylstyrene, 3-methylstyrene, 4-methylstyrene, 2-ethylstyrene, 3-ethylstyrene, 4-ethylstyrene, 2-propylstyrene, 3-propylstyrene, 4-propylstyrene, 2-isopropylstyrene, 3-isopropylstyrene, 4-isopropylstyrene, and 4-tert-butylstyrene are included, and the monomers can be used singly or two or more kinds thereof may be used in combination.

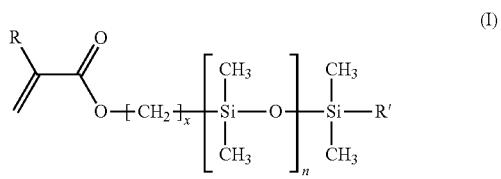

[in the formula, R is a hydrogen atom or a methyl group, R' is a hydrogen atom or an alkyl group having 1 to 4 carbon atoms, n is an integer equal to or greater than 0, and x is an integer from 1 to 3.]

Among them, as the monomer M1, a silicone macromonomer expressed by General Formula (I) above is preferable. The dispersion portion obtained by polymerizing the monomers M1 as described above shows excellent dispersibility to a non-polar dispersion medium. That is, as the dispersion medium included in the electrophoresis dispersion liquid described below, for example, when a dispersion medium including silicone oil as a main component is used, and when a hydrocarbon-based medium is used, affinity to the dispersion medium is excellent. Therefore, the electrophoresis particles 1 including the dispersion portions 32 obtained by polymerizing the monomers M1 can be dispersed in the dispersion medium with excellent dispersibility.

When the silicone macromonomers expressed by General Formula (I) described above is used as the monomers M1, the weight average molecular weight thereof is preferably in the range of approximately 1,000 to 10,000, and more preferably in the range of 3,000 to 8,000. The electrophoresis particles 1 including the dispersion portions 32 obtained by polymerizing the monomers M1 can be dispersed in the dispersion medium with excellent dispersibility.

In addition, if the weight average molecular weight of the dispersion portions 32 is preferably in the range of 20,000 to 100,000, and more preferably in the range of 30,000 to 60,000. Specifically, if the silicone macromonomers expressed by General Formula (I) described above or the hydrocarbon-based monomers are used as the monomers M1, the weight average molecular weight of the dispersion portions 32 is preferably in the range of 30,000 to 70,000, and more preferably in the range of 45,000 to 55,000. Accordingly, it is possible to enhance the dispersibility of the electrophoresis particles 1 in the electrophoresis dispersion liquid.

In the dispersion portion 32, it is preferable that the molecular weight of the dispersion unit on the base end portion side on which the dispersion portion is connected to the bonding portion 31 be smaller than that of the dispersion unit on the distal end portion side. More specifically, it is preferable that the molecular weight of the side chain included in the monomer M1 which becomes a precursor of the dispersion unit positioned on the base end portion side be smaller than that of the side chain included in the monomer M1 which becomes a precursor of the dispersion unit positioned on the distal end portion side. Accordingly, it is possible to enhance the dispersibility of the electrophoresis particles 1 in the electrophoresis dispersion liquid, and to bond the dispersion portions 32 to the surface of the base particle 2 with high density.

In addition, such a change of the molecular weight of the side chain may be a change in which the molecular weight continuously increases from the base end side to the distal end side, or a change in which the molecular weight stepwisely increases from the base end side to the distal end side.

The bonding portions 31 are bonded to the surface of the base particle 2 in the coating layer 3 included in the electrophoresis particle 1, and accordingly the polymer 33 is connected to the base particle 2.

In the invention, the bonding portion 31 can form a covalent bond by reaction with the first functional group that the base particle 2 is included on the surface thereof, bonding portion 31 is formed by polymerizing a plurality of the second monomers M2 included in the second functional group, and a plurality of bonding units derived from the monomers M2 are connected.

In this manner, it is possible to enhance the dispersibility of the electrophoresis particles 1 by using the polymer 33 including the bonding portions 31 with a plurality of bonding units each of which includes a second functional group. That is, the polymer 33 includes a plurality of second functional groups and the plurality of second functional groups exist to be concentrated in the bonding portions 31. Further, since the plurality of bonding units are bonded to the bonding portion 31, a portion that can react with the base particle 2 is greater than in the case in which only one bonding unit exists. Therefore, the polymer 33 can be securely bonded to the surface of the base particle 2 in the bonding portion 31 formed by polymerizing the plurality of monomers M2.

According to the embodiment, as described above, the first functional group included on the surface of the base particle 2 is a hydroxyl group, and the second functional group included in the monomers M2 is alkoxy silyl group. Since excellent reactivity in which the reaction between the first and second functional groups can be obtained by combining the first and second functional groups as described above, it is possible to more securely form the bond to the surface of the base particle 2 in the bonding portion 31.

The monomer M2 as described above includes one alkoxy silyl group expressed by General Formula (II) as the second functional group, and further includes one polymerization group so that the monomer M2 can be polymerized by the living radical polymerization.

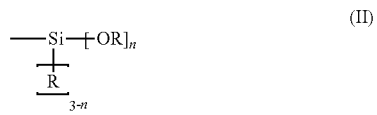

(II)

[in the formula, R is an alkyl group having 1 to 4 carbons, and n is an integer from 1 to 3.]

It is possible to form the bonding portions 31 obtained by polymerizing the monomers M2 by the living radical polymerization by using the configuration described above as the monomers M2. Further, the bonding portions 31 formed by the living radical polymerization shows excellent reactivity to the hydroxyl group which is the first functional group positioned on the surface of the base particle 2.

In addition, as the one polymerization group included in the monomer M2, in the same manner as in the monomer M1, for example, a polymerization group including a carbon-carbon double bond such as a vinyl group, a styryl group, and a (meth)acryloyl group is included.

As the monomers M2 described above, for example, a vinyl monomer, a vinyl ester monomer, a vinyl amide monomer, a (meth)acryl monomer, a (meth)acryl ester monomer, a (meth)acryl amide monomer, and a styryl monomer each of which include one alkoxy silyl group expressed by General Formula (II) described above are included. More specifically, a silane-based monomer including a silicon atom such as 3-(meta)acryloxy propyl triethoxy (methoxy)silane, vinyl triethoxy (methoxy)silane, vinyl triethoxy (methoxy)silane, 4-vinyl butyl triethoxy (methoxy) silane, 4-vinyl butyl triethoxy (methoxy)silane, 8-vinyl octyl triethoxy (methoxy)silane, 8-vinyl octyl triethoxy (methoxy)silane, 10-methacryloyloxy decyl triethoxy (methoxy)silane, 10-acryloyloxy decyl triethoxy (methoxy)silane, 10-methacryloyloxy decyl triethoxy (methoxy)silane, and 10-acryloyloxy decyl triethoxy (methoxy)silane are included, and the monomers M2 can be used singly or two or more kinds thereof may be used in combination.

In addition, in one polymer, the number of bonding units included in the bonding portion 31 is preferably in the range of 2 to 8, and more preferably in the range of 4 to 6. If the number exceeds the upper limit, the affinity of the bonding portion 31 to the dispersion medium becomes lower than that of the dispersion portion 32. Therefore, there is concern that dispersibility of the electrophoresis particles 1 decreases according to the kinds of the monomer M2, or the bonding portions 31 partially react with each other. In addition, if the number is lower than the lower limit, there is concern that the bond to the base particle 2 does not sufficiently progress according to the kind of the monomer M2, and the dispersibility of the electrophoresis particles 1 decreases.

In addition, the number of bonding units included in the bonding portion 31 can be calculated by analysis using a general analyzer such as an NMR spectrum, an IR spectrum, element analysis, and gel permeation chromatography (GPC). In the polymer 33, since the bonding portion 31 and the dispersion portion 32 are high molecular weight polymers, both have a certain molecular weight distribution. Accordingly, the analysis results as described above do not necessarily correspond to all the polymers 33, but if the number of bonding units obtained by the methods described above is at least 2 to 8, it is possible to obtain both of reactivity between the polymer 33 and the base particle 2, and dispersibility of the electrophoresis particles 1.

The polymer 33 as described above can be obtained by the manufacturing method described below. For example, if reversible addition fragmentation chain transfer polymerization (RAFT) is used, it is possible to obtain comparatively uniform polymers. Accordingly, if the monomers M2 are polymerized by adding 2 to 8 mole equivalent of the monomers M2 to the chain transfer agent, it is possible to set the number of bonding units in the bonding portion 31 to the scope described above. If the additive rate of the monomers M2 is equal to or less than 100%, with consideration for this, the polymerization reaction may be performed by setting the addition amount of the monomers M2 to be equal to or less than 2 to 8 mole equivalent.

In addition, if the bonding portion is synthesized after the dispersion portion 32 is synthesized, the dispersion portion 32 functions as the chain transfer agent. In this case, for example, the weight average molecular weight and the number average molecular weight of the macromolecules configuring the dispersion portion 32 are calculated by using a GPC method, and the addition amount of the monomers M2 is determined based on these.

Accordingly, it is possible to more securely exhibit the effect by configuring the electrophoresis particles 1 to include the polymers 33, so that the electrophoresis particles 1 can have excellent dispersibility in the electrophoresis dispersion liquid.

As described above, the electrophoresis particle 1 in which the polymer 33 having the bonding portions 31 and the dispersion portions 32 is bonded to the surface of the base particle 2 in the bonding portions 31 and the molecular weight distribution in the dispersion portions 32 is equal to or less than 1.2, for example, can be manufactured as follows by applying a method of manufacturing electrophoresis particles according to the invention.

Method of Manufacturing Electrophoresis Particles

A method of manufacturing the electrophoresis particles 1 includes a first step of obtaining the plurality of block copolymers 33 in which the dispersion portions 32 and the bonding portions 31 are bonded, and a second step of forming the coating layer 3 in which the plurality of block copolymers 33 are bonded to the base particle 2 by bonding the bonding portions 31 to the surface of the base particle 2 by reacting the first functional group included in the base particle 2 and the second functional group included in the second monomers M2. In the first step, after the dispersion portions 32 obtained by polymerizing the first monomers M1 are formed by the living radical polymerization using polymerization initiators, the bonding portions 31 obtained by polymerizing the second monomers M2 having the second functional groups may be formed, or after the bonding portions 31 are formed, the dispersion portions 32 may be formed. Here, a case in which the bonding portions are formed after the dispersion portions 32 are formed is described.

Hereinafter, respective steps are described in detail.

[1] First, the plurality of block copolymers 33 in which the dispersion portions 32 and the bonding portions 31 are bonded are formed (first step).

[1-1] First, the dispersion portions 32 obtained by polymerizing the first monomers M1 are formed by the living polymerization using the polymerization initiators.

As the living polymerization method, the living radical polymerization, living cationic polymerization, or living anionic polymerization, and the like are included. Among them, the living radical polymerization is preferable. By performing the living radical polymerization, reaction liquid generated in the reaction system can be simply used, and the monomers M1 can be polymerized with good controllability of the reaction. Further, it is possible to securely cause the molecular weight distribution in the dispersion portions 32 to be equal to or less than 1.2. As a result, it is possible to cause the obtained electrophoresis particles 1 to exhibit the uniform dispersion property in the electrophoresis dispersion liquid.

As the living radical polymerization method, atom transfer radical polymerization (ATRP), nitroxide-mediated radical polymerization (NMP), organotellurium-mediated radical polymerization (TERP), reversible addition fragmentation chain transfer polymerization (RAFT), and the like are included. Among them, the reversible addition fragmentation chain transfer polymerization (RAFT) is preferably used. In the reversible addition fragmentation chain transfer polymerization (RAFT), a metal catalyst is not used, there is no concern of metal pollution, and the polymerization at the time of the polymerization of the monomers M1 can be easily performed. In addition, the molecular weight distribution in the dispersion portions 32 can be more securely set to be equal to or less than 1.2.

The polymerization initiators (radical polymerization initiators) are not particularly limited. However, for example, azo-based initiators such as 2,2'-azobisisobutyronitrile (AIBN), 2,2'-azobis(4-methoxy-2,4-dimethylvaleronitrile), 2,2'-azobis(2,4-dimethylvaleronitrile), dimethyl 2,2'-azobis (2-methyl propionate), 1,1'-azobis(cyclohexane-1-carbonitrile), 2,2'-azobis[2-(2-imidazolin-2-yl)propane]dihydrochloride, 2,2'-azobis[2-(2-imidazolin-2-yl)propane], and persulfate such as potassium persulfate and ammonium peroxodisulfate are included.

In addition, when the reversible addition fragmentation chain transfer polymerization (RAFT) is used, in addition to the polymerization initiators, the chain transfer agent (RAFT agent) is used. The chain transfer agent is not particularly limited, but, for example, a sulfur compound including functional groups such as a dithioester group, a trithiocarbonate group, a xanthate group, and a dithiocarbamate group are included.

Specifically, as the chain transfer agent, compounds expressed by Chemical Formulae (1) to (7) described below are included, and the compounds may be singly used, or two or more kinds thereof may be used in combination. These compounds preferably used since they are easily obtained and the reactions thereof can be easily controlled.

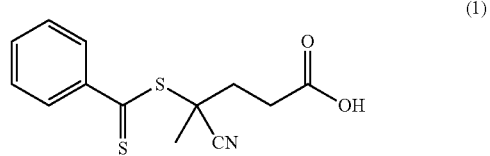

(1)

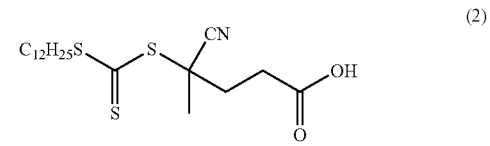

(2)

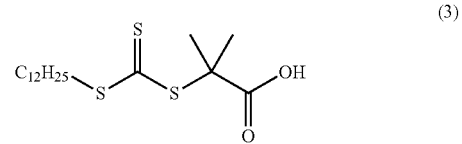

(3)

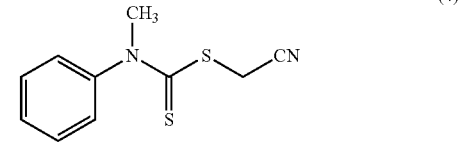

(4)

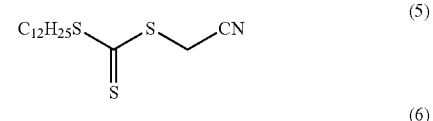

(5)

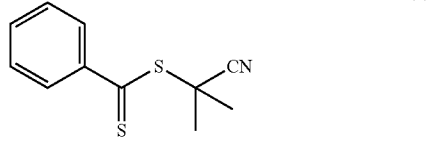

(6)

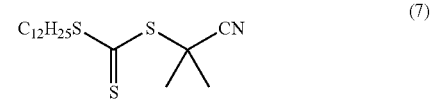

(7)

Among them, the chain transfer agent is preferably 2-cyano-2-propylbenzodithioate expressed by Chemical Formula (6). Accordingly, the reaction can be more easily controlled.

Further, when the reversible addition fragmentation chain transfer polymerization (RAFT) is used, the ratios of the monomers M1, the polymerization initiators, and the chain transfer agent are appropriately determined in consideration of the polymerization degree of the dispersion portions 32 to be formed or the reactivity of compounds such as the monomers M1. However, the molar ratios thereof are preferably monomer:polymerization initiator:chain transfer agent=500 to 5:5 to 0.25:1. Accordingly, the lengths (polymerization degrees) of the dispersion portions 32 obtained by polymerizing the monomers M1 can be appropriately set, and the dispersion portions 32 can be generated with high efficiency so that the molecular weight distribution is equal to or less than 1.2.

As a solvent for preparing solution for polymerizing the monomers M1 by the living radical polymerization, for example, water, alcohols such as methanol, ethanol, and butanol, hydrocarbons such as hexane, octane, benzene, toluene, and xylene, ethers such as diethyl ether and tetrahydrofuran, and halogenated aromatic hydrocarbons such as chlorobenzene and o-dichlorobenzene are included, and these can be used singly, and can be used as a mixed solvent.

In addition, before the polymerization reaction is started, the solution (reaction liquid) is preferably subjected to a dioxidation treatment. As the dioxidation treatment, for example, substitution and a purge treatment after vacuum deaeration by inert gas such as argon gas and nitrogen gas are included.

In addition, at the time of polymerization reaction of the monomers M1, the polymerization reaction of monomers can be promptly and securely performed by heating (warming up) the solution to a predetermined temperature.

The heating temperature is slightly different according to the kind of the monomers M1, and is not particularly limited. However, the heating temperature is, preferably, in the range of approximately 30° C. to 100° C. In addition, when the heating temperature is set to be in the temperature described above, the heating time (reaction time) is preferably in the range of approximately 5 hours to 48 hours.

When the reversible addition fragmentation chain transfer polymerization (RAFT) is used, fragments of the used chain transfer agent exist at one terminal (distal end portion) of the dispersion portion 32. Also, in the next step of [1-2], the dispersion portions 32 including the fragments function as the chain transfer agent in the reaction of polymerizing the bonding portions 31 in the dispersion portions 32.

[1-2] Subsequently, the bonding portions 31 obtained by polymerizing the second monomers M2 including the first functional groups included in the base particles 2 and the second functional groups having reactivity are formed so as to be bonded to the dispersion portions 32.

Accordingly, the polymers 33 configured with block copolymers in which the dispersion portions 32 and the bonding portions 31 are bonded are generated.

In addition, in Step [1-2], prior to the formation of the bonding portions 31 using the monomers M2, if necessary, a purification treatment (removal treatment) of removing the unreacted monomers M1 used in Step [1-1], a solvent, and impurities such as polymerization initiators, and isolating and purifying the dispersion portions 32 may be performed. Accordingly, it is possible to obtain the more uniform and highly refined polymers 33. The purification treatment is not particularly limited, and includes, for example, a column chromatography method, a recrystallization method, and a reprecipitation method are included. The purification treatments may be used singly, or two or more thereof may be used in combination.

Further, as described above, when the reversible addition fragmentation chain transfer polymerization (RAFT) is used, used fragments of the chain transfer agents exist at one terminals of the dispersion portions 32. Therefore, the bonding portions 31 configured as above are formed by preparing a solution containing the dispersion portions 32 obtained by completing Step [1-1], the monomers M2, and polymerization initiators, and performing the living polymerization again in the solution.

In addition, as the solvent used in the Step [1-2], the same materials as described in Step [1-1] above can be used, and the condition when the monomers M2 are polymerized in the solution may be set to be the same as the condition when the monomers M1 are polymerized in the solution in Step [1-1] above.

[2] Subsequently, the plurality of block copolymers 33 are bonded to the base particle 2 by causing the first functional groups included in the base particle 2 and the plurality of second functional groups included in the bonding portions 31 to react with each other so that chemical bonds are formed between them (second step).

Accordingly, the electrophoresis particles 1 in which at least portions of the base particles 2 are coated with the coating layers 3 are obtained. As the processes, a dry process and a wet process are included.

Dry Process

In the dry process, first, a solution obtained by mixing the polymers 33 and the base particles 2 in a proper solvent is prepared. In addition, in order to promote hydrolysis of the alkoxy silyl groups included in the polymers 33, a small amount of water, an acid, and a base may be added to the solution, if necessary. In addition, heating, photoirradiation, and the like may be performed, if necessary.

At this point, with respect to the volume of the base particles 2, the volume of the solvent is preferably in the range of approximately 1% by volume to 20% by volume, and more preferably in the range of approximately 5% by volume to 10% by volume. Accordingly, since it is possible to increase the opportunity for contacts of the polymers 33 with the base particles 2, it is possible to more securely bond the bonding portions 31 to the surface of the base particles 2.

Subsequently, the polymers 33 are absorbed on the surface of the base particles 2 with high efficiency by performing dispersion by ultrasonic irradiation or by stirring by using a ball mill, a bead mill, or the like to remove the solvent.

Subsequently, the electrophoresis particles 1 are obtained by heating the powder obtained by removing the solvent in the condition of preferably 100° C. to 200° C. for 1 hour or more to decompose the alkoxy silyl groups and by forming chemical bonds with the hydroxyl group exposed to the surfaces of the base particles 2.

Subsequently, the resultant is washed several times in the solvent while using a centrifugal separator so that the remained polymers 33 absorbed on the surfaces of the base particles 2 are removed without forming chemical bonds.

The refined electrophoresis particles 1 are obtained by performing the processes as described above.

Wet Process

In the wet process, first, a solution obtained by mixing the polymers 33 and the base particles 2 in a proper solvent is prepared. In addition, in order to promote hydrolysis of the alkoxy silyl groups included in the polymers 33, a small amount of water, an acid, and a base may be added to the solution, if necessary. In addition, heating, photoirradiation, and the like may be performed, if necessary.

At this point, with respect to the volume of the base particles 2, the volume of the solvent is preferably in the range of approximately 1% by volume to 20% by volume, and more preferably in the range of approximately 5% by volume to 10% by volume. Accordingly, since it is possible to increase the opportunity for contacts of the polymers 33 with the base particles 2, it is possible to more securely bond the bonding portions 31 to the surface of the base particles 2.

Subsequently, the polymers 33 are absorbed on the surface of the base particles 2 with high efficiency by performing dispersion by ultrasonic irradiation or by stirring by using a ball mill, a bead mill, or the like. At this state, the electrophoresis particles 1 are obtained by heating the solution in the condition of preferably 100° C. to 200° C. for 1 hour or more to decompose the alkoxy silyl groups and by forming chemical bonds with the hydroxyl group exposed to the surfaces of the base particles 2.

Subsequently, the resultant is washed several times in the solvent while using a centrifugal separator so that the remained polymers 33 absorbed on the surfaces of the base particles 2 are removed without forming chemical bonds.

The refined electrophoresis particles 1 are obtained by performing the processes as described above.

In addition, according to the kinds of the monomers M1 that configures the polymers 33, if the electrophoresis particles 1 are dried, the electrophoresis particles 1 may not be dispersed in the dispersion solvent. In such cases, the cleaning operation is preferably performed by a solvent displacement method in which the reaction solvent is gradually substituted with the dispersion solvent (drying step is not performed).

Further, as the solvent used in the steps, the same materials as described in Step [1-1] above can be used.

Electrophoresis Dispersion Liquid

Subsequently the electrophoresis dispersion liquid according to the invention may be described.

The electrophoresis dispersion liquid is obtained by dispersing (suspending) at least one kind of electrophoresis particles (electrophoresis particles according to the invention) in the dispersion medium (liquid dispersion medium).

As the dispersion medium, dispersion media of which the boiling point is equal to or greater than 100° C., and the insulation property is relatively high are preferably used. As the dispersion medium, for example, various kinds of water (distilled water, pure water, and the like), alcohols such as butanol or glycerol, cellosolve such as butyl cellosolve, esters such as butyl acetates, ketones such as dibutylketone, aliphatic hydrocarbons such as pentane (liquid paraffin), alicyclic hydrocarbon such as cyclohexane, aromatic hydrocarbons such as xylene, halogenated hydrocarbons such as methyl chloride, aromatic heterocyclic rings such as pyridine, nitriles such as acetonitrile, amides such as N,N-dimethylformamide, carboxylate, silicone oil, and various kinds of oil are included, and the dispersion media can be used singly, or in mixture.

Among them, the dispersion medium preferably includes, as a main component, aliphatic hydrocarbons (liquid paraffin) or silicone oil. Since the cohesion suppressing effect of the electrophoresis particles 1 is high, the dispersion medium including liquid paraffin or silicone oil as the main component can suppress the chronological deterioration of the display performance of an electrophoresis display device 920 illustrated in FIG. 3. In addition, since the liquid paraffin or the silicone oil does not have an unsaturated bond, the weather resistance is excellent, and safety is high.

In addition, the dispersion medium having the dielectric constant in the range of 1.5 to 3 is preferably used, and the dispersion medium having the dielectric constant in the range of 1.7 to 2.8 is more preferably used. Such dispersion media causes the electrophoresis particles 1 to have excellent dispersibility and has a good electric insulation property. Therefore, the dispersion media contribute to the realization of the electrophoresis display device 920 that has small electricity consumption and high contrast. In addition, the value of the dielectric constant is measured in 50 Hz, and the value is measured with respect to the dispersion medium of which the containing amount of the moisture is equal to or less than 50 ppm, and the temperature is 25° C.

In addition, in the dispersion medium, if necessary, various kinds of addition agents such as electrolytes, (anionic or catonic) surfactants, metallic soap, resin material, rubber material, oils, varnish, electric charge controlling agents made of particles such as compounds, lubricants, stabilizers, various kinds of dyes may be added.

In addition, the dispersion of the electrophoresis particles to the dispersion medium can be performed, for example, by using a paint shaker method, a ball mill method, a media mill method, an ultrasonic wave dispersion method, and a stirring dispersion method, singly or in combination.

Among the electrophoresis dispersion liquid, the electrophoresis particles 1 exhibit excellent dispersion properties by actions of the polymers 33 having the coating layers 3.

Electrophoresis Display Device

Next, the electrophoresis display device to which the electrophoresis sheet according to the invention (electrophoresis device according to the invention) is applied is described.

Figure 3:
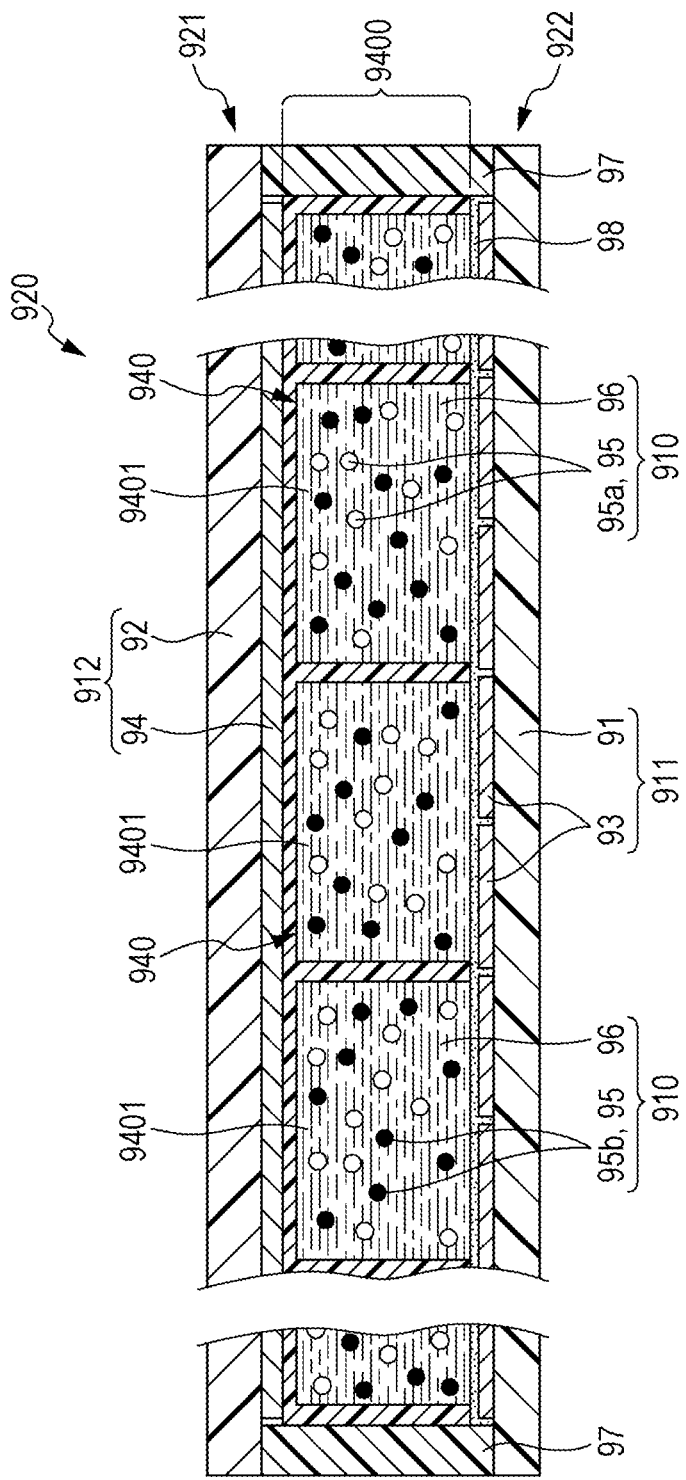
FIG. 3 is a diagram schematically illustrating a vertical section of an electrophoresis display device according to an embodiment.
Figure 4A:
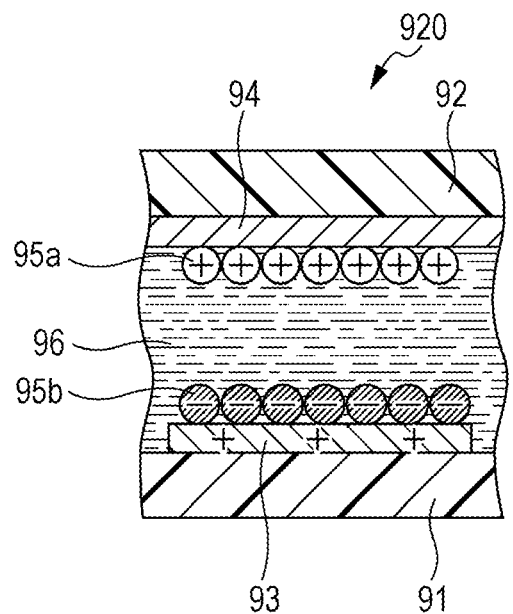
FIGS. 4A and 4B are diagrams schematically illustrating operation principles of the electrophoresis display device illustrated in FIG. 3.
Figure 4B:
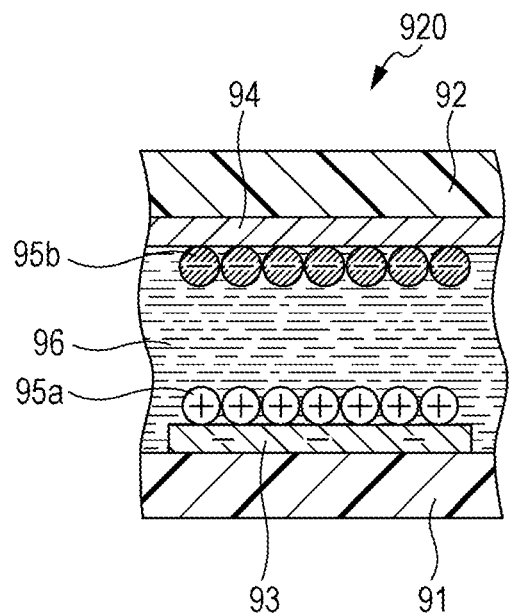

FIG. 3 is a diagram schematically illustrating a vertical section of an electrophoresis display device according to an embodiment, and FIGS. 4A and 4B are diagrams schematically illustrating operation principles of the electrophoresis display device illustrated in FIG. 3. In addition, herein below, for convenience of description, upper sides of FIGS. 3 and 4 are referred to as "upper" and lower sides thereof are referred to as "lower".

The electrophoresis display device 920 illustrated in FIG. 3 includes an electrophoresis display sheet (front plane) 921, a circuit substrate (back plane) 922, an adhesive agent layer 98 that joins the electrophoresis display sheet 921 and the circuit substrate 922, and sealing portions 97 that airtightly seal gaps between the electrophoresis display sheet 921 and the circuit substrate 922.

The electrophoresis display sheet (electrophoresis sheet according to the invention) 921 includes a substrate 912 that has a flat base portion 92 and a second electrode 94 provided on the lower surface of the base portion 92, and a display layer 9400 that is provided on the lower surface (one surface) side of the substrate 912, and that has a matrix-shaped partition 940 and electrophoresis dispersion liquid 910.

Meanwhile, the circuit substrate 922 includes a counter substrate 911 that has a flat base portion 91 and a plurality of first electrodes 93 provided on the upper surface of the base portion 91, and a circuit (not illustrated) that is provided on the counter substrate 911 (the base portion 91), and that includes, for example, a switching element such as TFT.

Hereinafter, configurations of respective units are sequentially described.

The base portion 91 and the base portion 92 are configured with sheet-shaped (flat) members, and have a function of supporting and protecting the respective members provided therebetween.

The respective base portions 91 and 92 may be flexible or hard, but are preferably flexible. The flexible electrophoresis display device 920, that is, for example, the electrophoresis display device 920 that is useful for constructing electronic paper, can be obtained by using the flexible base portions 91 and 92.

Also, if the respective base portions (base material layers) 91 and 92 are flexible, it is preferable that these be configured with resin materials, respectively.

Average thicknesses of the base portions 91 and 92 are appropriately set according to configuration materials, uses, and the like, but are preferably in the range of approximately 20 μm to 500 μm, and preferably in the range of approximately 25 μm to 250 μm.

The layer-shaped (film-shaped) first and second electrodes 93 and 94 are respectively provided on the surfaces of the base portions 91 and 92 on the partition 940 side, that is, on the upper surface of the base portion 91 and the lower surface of the base portion 92.

If electric voltages are applied between the first electrodes 93 and the second electrode 94, electric fields are generated therebetween, and the electric fields work on electrophoresis particles (electrophoresis particles according to the invention) 95.

According to the embodiment, the second electrode 94 is considered as a common electrode, and the first electrodes 93 are considered as individual electrodes (pixel electrodes connected to switching elements) partitioned into a matrix shape so that a portion in which the second electrode 94 and one of the first electrodes 93 are overlapped configures one pixel.

The configuration materials of the respective electrodes 93 and 94 are not particularly limited as long as they are substantially conductive.

The respective average thicknesses of the electrodes 93 and 94 are appropriately set according to configuration materials, and uses thereof, and the like, and are not particularly limited, but are preferably in the range of approximately 0.05 μm to 10 μm, and in the range of approximately 0.05 μm to 5 μm.

In addition, among the base portions 91 and 92 and the electrodes 93 and 94, a base portion and an electrode provided on the display surface side (the base portion 92 and the second electrode 94 according to the embodiment) are considered to be light transmissive, that is, substantially transparent (colorless, colored transparent, or translucent).

In the electrophoresis display sheet 921, the display layer 9400 is provided so as to come into contact with the lower surface of the second electrode 94.

The display layer 9400 has a configuration in which the electrophoresis dispersion liquid (aforementioned electrophoresis dispersion liquid according to the invention) 910 is stored (sealed) in a plurality of pixel spaces 9401 formed by the partition 940.

The partition 940 is formed between the counter substrate 911 and the substrate 912, so as to partition the counter substrate 911 and the substrate 912 into a matrix shape.

As the configuration material of the partition 940, various kinds of resin materials, for example, thermoplastic resins such as an acryl-based resin, a urethane-based resin, and an olefin-based resin, thermosetting resins such as an epoxy-based resin, a melamine-based resin, and a phenol-based resin are included, and the resins can be used singly or two or more kinds thereof can be used in combination.

According to the embodiment, the electrophoresis dispersion liquid 910 stored in the pixel spaces 9401 is obtained by dispersing (suspending) two kinds of colored particles 95b and white particles 95a (at least one kind of electrophoresis particles 1) in dispersion media 96, and the aforementioned electrophoresis dispersion liquid according to the present invention is applied.

In the electrophoresis display device 920, if electric voltages are applied between the first electrodes 93 and the second electrode 94, according to the electric fields generated therebetween, the colored particles 95b and the white particles 95a (the electrophoresis particles 1) electrophoretically migrate toward some electrodes.

According to the present embodiment, particles having positive charges are used as the white particles 95a, and particles having negative charges are used as the colored particles (black particles) 95b. That is, the electrophoresis particles 1 in which the base particles 2 are positively charged are used as the white particles 95a, and the electrophoresis particles 1 in which the base particles 2 are negatively charged are used as the colored particles 95b.

When such electrophoresis particles 1 are used, if the first electrodes 93 are set to have positive potentials, as illustrated in FIG. 4A, the white particles 95a move to the second electrode 94 side, and are gathered on the second electrode 94. Meanwhile, the colored particles 95b move to the first electrodes 93 side, and are gathered on the first electrodes 93. Therefore, if the electrophoresis display device 920 is seen from the upper side (display surface side), the color of the white particles 95a is seen, that is, a white color is seen.

In contrast, if the first electrodes 93 are set to have negative potentials, the white particles 95a move to the first electrodes 93 side as illustrated in FIG. 4B, and are gathered on the first electrodes 93. Meanwhile, the colored particles 95b move to the second electrode 94 side, and are gathered on the second electrode 94. Therefore, if the electrophoresis display device 920 is seen from the upper side (display surface side), the color of the colored particles 95b is seen, that is, a black color is seen.

In such configuration, desired information (image) is displayed on the display surface side of the electrophoresis display device 920 according to the color combination between the white particles 95a and the colored particles 95b, and the number of particles gathered on the electrodes 93 and 94 by appropriately setting the electric charge amounts of the white particles 95a and the colored particles 95b (the electrophoresis particles 1), a polarity of the electrode 93 or 94, and potential differences between the electrodes 93 and 94.

In addition, the specific gravity of the electrophoresis particles 1 is preferably set to be substantially the same as that of the dispersion media 96. Accordingly, the electrophoresis particles 1 can stay for a long time at a certain position in the dispersion media 96 after the application of the electric voltage between the electrodes 93 and 94 is stopped. That is, the information displayed on the electrophoresis display device 920 is maintained for a long time.

In addition, the average diameter of the electrophoresis particles 1 is preferably in the range of approximately 0.1 μm to 10 μm, and more preferably in the range of approximately 0.1 μm to 7.5 μm. Cohesion among the electrophoresis particles 1 and precipitation in the dispersion media 96 can be securely prevented by setting the average diameter of the electrophoresis particles 1 to be in the range described above. As a result, it is possible to appropriately prevent the deterioration of the display quality of the electrophoresis display device 920.

According to the present embodiment, the electrophoresis display sheet 921 and the circuit substrate 922 are joined via the adhesive agent layer 98. Accordingly, the electrophoresis display sheet 921 and the circuit substrate 922 can be more securely fixed.

The average thickness of the adhesive agent layer 98 is not particularly limited, but is preferably in the range of approximately 1 μm to 30 μm, and more preferably in the range of approximately 5 μm to 20 μm.

The sealing portions 97 are formed between the base portion 91 and the base portion 92 along the edges thereof. The electrodes 93 and 94, the display layer 9400, and the adhesive agent layer 98 are airtightly sealed by the sealing portions 97. Accordingly, the deterioration of the display performance of the electrophoresis display device 920 can be more securely prevented by preventing the permeation of moisture into the electrophoresis display device 920.

As the configuration materials of the sealing portions 97, the same materials as described as the configuration materials of the partition 940 can be used.

Electronic Apparatus

Next, an electronic apparatus according to the invention is described.

The electronic apparatus according to the invention includes the electrophoresis display device 920 as described above.

Electronic Paper

First, an embodiment when the electronic apparatus according to the invention is applied to electronic paper is described.

Figure 5:
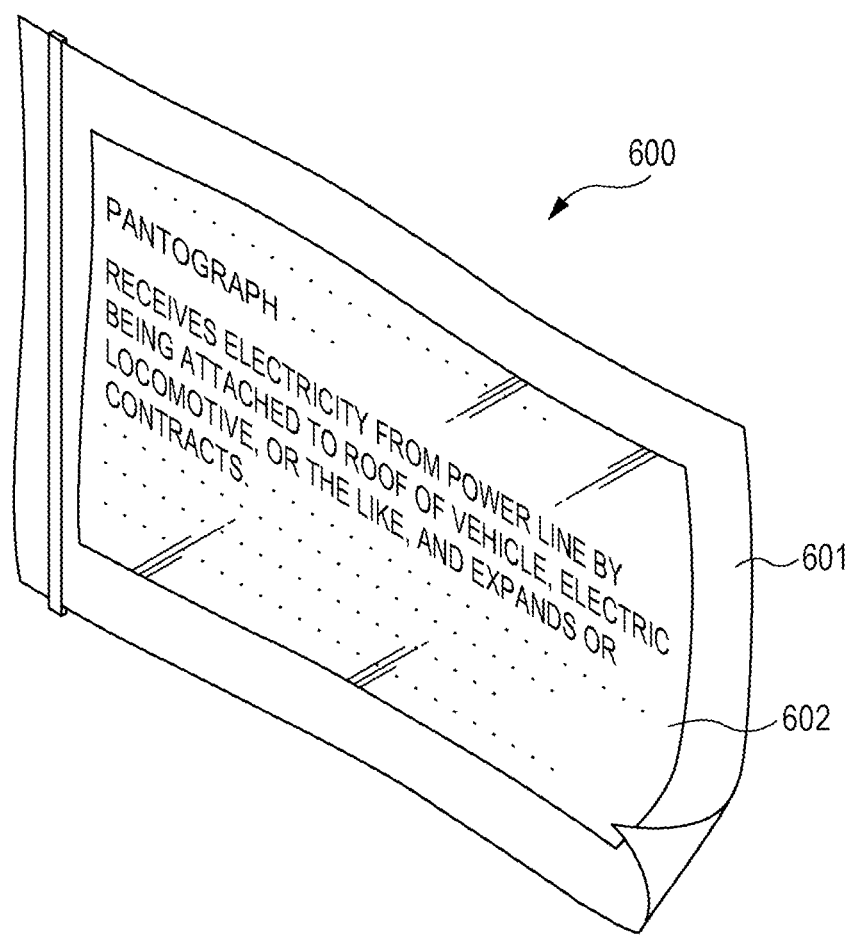
FIG. 5 is a perspective view illustrating an embodiment when the electronic apparatus according to the invention is applied to electronic paper.
Figure 7:
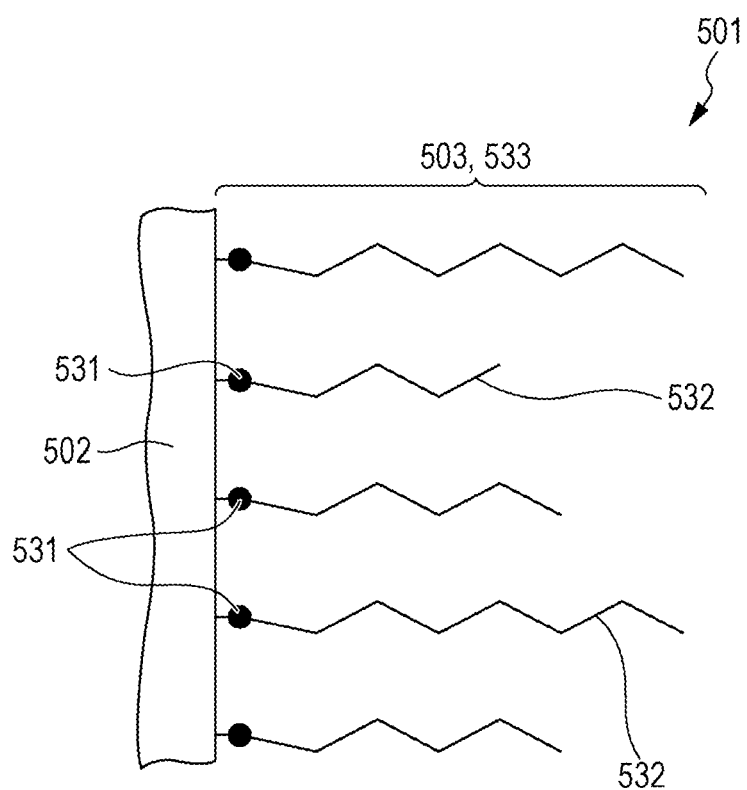
FIG. 7 is a diagram schematically illustrating a vertical section of a structure in an electrophoresis particle according to the related art.

FIG. 5 is a perspective view illustrating an embodiment when the electronic apparatus according to the invention is applied to the electronic paper.

The electronic paper 600 illustrated in FIG. 5 includes a main body 601 configured with a rewritable sheet having texture and flexibility the same as those of paper, and a display unit 602.

In the electronic paper 600, the display unit 602 is configured with the electrophoresis display device 920 as described above.

Display

Next, an embodiment when the electronic apparatus according to the invention is applied to a display is described.

FIGS. 6A and 6B are diagrams illustrating an embodiment to which the electronic apparatus according to the invention is applied to the display. Among them, FIG. 6A is a cross-sectional view, and FIG. 6B is a plan view.

A display (display device) 800 illustrated in FIGS. 6A and 6B includes a main body portion 801 and the electronic paper 600 that is detachably provided on the main body portion 801.

In the main body portion 801, an insertion opening 805 through which the electronic paper 600 can be inserted is formed on a side portion (right side in FIG. 6A) thereof, and two conveying roller pairs 802a and 802b are formed on the inside thereof. If the electronic paper 600 is inserted to the main body portion 801 via the insertion opening 805, the electronic paper 600 is installed in the main body portion 801 in a state being interposed between the conveying roller pairs 802a and 802b.

The rectangular hole portion 803 is formed on the display surface side (front side of the paper in FIG. 6B) of the main body portion 801, and a transparent glass plate 804 is fitted into the hole portion 803. Accordingly, the electronic paper 600 can be recognized from the outside of the main body portion 801 in a state of being provided in the main body portion 801. That is, in the display 800, a display surface is configured by causing the electronic paper 600 in a state of being provided in the main body portion 801 to be recognized in the transparent glass plate 804.

A terminal portion 806 is provided in the distal end portion of the electronic paper 600 in the insertion direction (left side in FIG. 6A), and a socket 807 to which the terminal portion 806 is connected in a state in which the electronic paper 600 is provided in the main body portion 801 is provided inside the main body portion 801. A controller 808 and an operation portion 809 are electrically connected to each other in the socket 807.

In the display 800, the electronic paper 600 is detachably provided to the main body portion 801, so that the electronic paper 600 can be carried and used in a state of being removed from the main body portion 801.

In addition, in such a display 800, the electronic paper 600 is configured with the electrophoresis display device 920 as described above.

In addition, the electronic apparatus according to the invention is not limited to an application to the above, and, for example, televisions, view finder-type, monitor direct vision-type video tape recorders, car navigation apparatuses, pagers, electronic organizers, electronic calculators, electronic newspaper, word processors, personal computers, workstations, video phones, POS terminals, and touch panels are included. It is possible to apply the electrophoresis display device 920 to display portions of these various electronic apparatuses.

Hereinafter, a method of manufacturing electrophoresis particles, electrophoresis particles, electrophoresis dispersion liquid, an electrophoresis sheet, an electrophoresis device, and an electronic apparatus are described with reference to a preferred embodiment illustrated in the accompanying drawings. However, the invention is not limited thereto, but the configurations of the respective portions may be substituted with arbitrary configurations having the same functions. In addition, other arbitrary configurations may be added to the invention.

In addition, one or more steps having arbitrary purposes may be added to the method of manufacturing electrophoresis particles according to the invention.

EXAMPLES

Subsequently, specific examples according to the invention are described.

Evaluations of Manufacture of Electrophoresis Particles, Preparation of Electrophoresis Dispersion Liquid, and Electrophoresis Dispersion Liquid Example 1

1. Synthesization of Dispersion Portion

Silicone macromonomers with molecular weight of 1,000 ("Silaplane FM-0711" manufactured by JNC corporation) of 10 g (10 mmol), 2-cyano-2-propyl benzodithioate of 45 mg (0.2 mmol), azobisisobutyronitrile of 33 mg (0.2 mmol), and ethyl acetate were added to a flask, were heated and stirred for 20 hours, and the silicone macromonomers were polymerized. The resultant was cooled down to the room temperature, the reaction ended, the solvent was removed, and a reddish brown silicone polymer reaction solution was obtained.

The obtained reaction solution was refined by silica gel column using a mixture solvent of hexane and chloroform, as a development solvent, and impurities were removed, and silicone polymers were isolated. Weight average molecular weights (Mw) and number average molecular weights (Mn)

of the silicone polymers obtained by the gel permeation chromatography in toluene as a development solvent were measured, and it was found that the molecular weight distributions (Mw/Mn) were equal to or less than 1.2.

2. Synthesization of Bonding Portion

The above obtained silicone polymers of 1 g (19 µmol), 3-methacryloxypropyltriethoxysilane ("KBE-503" manufactured by Shin-Etsu Chemical Co., Ltd.) of 21 mg (72 µmol), azobisisobutyronitrile of 2.4 mg (15 µmol), and ethyl acetate were added to a flask, and were heated and stirred, and polymerization was performed. The resultant was cooled down to the room temperature, the reaction ended, the solvent was removed, and block copolymers were obtained.

3. Adjustment of Electrophoresis Dispersion Liquid

The above obtained block copolymers of 1 g, titanium oxide particles ("CR-90" manufactured by Ishihara Sangyo Kaisha, Ltd.) of 5 g, and silicone oil ("KF-96-20cs" manufactured by Shin-Etsu Chemical Co., Ltd.) were added to a flask, and were heated and stirred, block copolymers were bonded to particles, and electrophoresis particles were obtained. From the solution after the reaction, unreacted block copolymers were removed, silicone oils were substituted with "KF-96-2cs" manufactured by Shin-Etsu Chemical Co., Ltd., and white electrophoresis dispersion liquid was obtained. At this point, electrophoresis particles in the dispersion liquid were adjusted to be 33 wt %.

4. Evaluation of Electrophoresis Dispersion Liquid

The dispersibility of electrophoresis particles in the dispersion liquid by a static light scattering method (volume average particle diameter (nm)) was measured.

In addition, black electrophoresis dispersion liquid adjusted in the same manner as above except that titanium nitride particles were used instead of titanium oxide particles was prepared, the white electrophoresis dispersion liquid and the black electrophoresis dispersion liquid were mixed so that the volume ratio thereof was to be 10:1, the mixture was injected into transparent electrode cells with the thickness of 50 µm, and display characteristics (white reflectance (%), black reflectance (%), and contrast) were evaluated.

Example 2

The dispersion portion was synthesized in the same manner as Example 1 except that silicone macromonomers with the molecular weight of 5,000 ("Silaplane FM-0721" manufactured by JNC corporation) of 10 g (2 mmol) were used as the monomers. The bonding portion was synthesized in the same manner as Example 1 except that the obtained silicone polymers of 1 g (18 µmol) were used. The electrophoresis dispersion liquid was adjusted and evaluated in the same manner as Example 1 by using the obtained block copolymers.

Example 3

The dispersion portion was synthesized in the same manner as Example 1 except that silicone macromonomers with the molecular weight of 10,000 ("Silaplane FM-0725" manufactured by JNC corporation) of 10 g (1 mmol) were used as the monomers. The bonding portion was synthesized in the same manner as Example 1 except that the obtained silicone polymers of 1 g (18 µmol) were used. The electrophoresis dispersion liquid was adjusted and evaluated in the same manner as Example 1 by using the obtained block copolymers.

Example 4

The dispersion portion was synthesized in the same manner as Example 1 except that monomers of 10 g (20 mmol) obtained by synthesizing methacryl-terminated dimethyl silicone macromonomers with the molecular weight of 500 were used as the monomers. The bonding portion was synthesized in the same manner as Example 1 except that the obtained silicone polymers of 1 g (21 µmol) were used. The electrophoresis dispersion liquid was adjusted and evaluated in the same manner as Example 1 by using the obtained block copolymers.

Example 5

The dispersion portion was synthesized in the same manner as Example 1 except that monomers of 10 g (0.5 mmol) obtained by synthesizing methacryl-terminated dimethyl silicone macromonomers with the molecular weight of 20,000 were used as the monomers. The bonding portion was synthesized in the same manner as Example 1 except that the obtained silicone polymers of 1 g (17 µmol) were used. The electrophoresis dispersion liquid was adjusted and evaluated in the same manner as Example 1 by using the obtained block copolymers.

Example 6

The dispersion portion was synthesized in the same manner as Example 1 except that silicone macromonomers with the molecular weight of 1,000 ("Silaplane FM-0711" manufactured by JNC corporation) of 10 g (10 mmol), 2-cyano-2-propyl benzodithioate of 22 mg (0.1 mmol), and azobisisobutyronitrile of 16 mg (0.1 mmol) were used, and the polymerization time was 36 hours. The bonding portion was synthesized in the same manner as Example 1 except that the obtained silicone polymers of 1 g (10 µmol), 3-methacryloxypropyltriethoxysilane ("KBE-503" manufactured by Shin-Etsu Chemical Co., Ltd.) of 10 mg (36 µmol), and azobisisobutyronitrile of 1.6 mg (10 µmol) were used. The electrophoresis dispersion liquid was adjusted and evaluated in the same manner as Example 1 by using the obtained block copolymers.

Example 7

The dispersion portion was synthesized in the same manner as Example 1 except that silicone macromonomers with the molecular weight of 5,000 ("Silaplane FM-0721" manufactured by JNC corporation) of 10 g (2 mmol), 2-cyano-2-propyl benzodithioate of 22 mg (0.1 mmol), and azobisisobutyronitrile of 16 mg (0.1 mmol) were used, and the polymerization time was 36 hours. The bonding portion was synthesized in the same manner as Example 1 except that the obtained silicone polymers of 1 g (10 µmol), 3-methacryloxypropyltriethoxysilane ("KBE-503" manufactured by Shin-Etsu Chemical Co., Ltd.) of 10 mg (36 µmol), and azobisisobutyronitrile of 1.6 mg (10 µmol) were used. The electrophoresis dispersion liquid was adjusted and evaluated in the same manner as Example 1 by using the obtained block copolymers.

Example 8

The dispersion portion was synthesized in the same manner as Example 1 except that silicone macromonomers with the molecular weight of 10,000 ("Silaplane FM-0725"

manufactured by JNC corporation) of 1 g (1 mmol), 2-cyano-2-propyl benzodithioate of 22 mg (0.1 mmol), and azobisisobutyronitrile of 16 mg (0.1 mmol) were used, and the polymerization time was 36 hours. The bonding portion was synthesized in the same manner as Example 1 except that the obtained silicone polymers of 1 g (10 µmol), 3-methacryloxypropyltriethoxysilane ("KBE-503" manufactured by Shin-Etsu Chemical Co., Ltd.) of 10 mg (36 µmol), and azobisisobutyronitrile of 1.6 mg (10 µmol) were used. The electrophoresis dispersion liquid was adjusted and evaluated in the same manner as Example 1 by using the obtained block copolymers.

Example 9

The dispersion portion was synthesized in the same manner as Example 1 except that a styrene macromonomer with a molecular weight of 6,000 ("AS-6" manufactured by Toagosei Co., Ltd.) of 20 g (1.7 mmol) was used instead of the silicone macromonomers and refined by silica gel column using a mixture solvent of hexane and toluene, as a development solvent. The bonding portion was synthesized in the same manner as Example 1 except that the obtained styrene polymers of 1 g (18 µmol), 3-methacryloxypropyl-triethoxysilane ("KBE-503" manufactured by Shin-Etsu Chemical Co., Ltd.) of 16 mg (54 µmol), and azobisisobutyronitrile of 2.4 mg (15 µmol) were used. The electrophoresis dispersion liquid was adjusted and evaluated in the same manner as Example 1 by using the obtained block copolymers.

Example 10

The dispersion portion was synthesized in the same manner as Example 1 except that an n-lauryl methacrylate with a molecular weight of 254 (manufactured by Sigma-Aldrich Corporation) of 10 g (39.4 mmol) was used instead of the silicone macromonomers and refined by silica gel column using a mixture solvent of hexane and ethyl acetate, as a development solvent. The bonding portion was synthesized in the same manner as Example 1 except that the obtained alkyl polymers of 1 g (20 µmol) were used. The electrophoresis dispersion liquid was adjusted and evaluated in the same manner as Example 1 by using the obtained block copolymers.

Example 11

The dispersion portion was synthesized in the same manner as Example 1 except that the addition amount of azobisisobutyronitrile is 8.3 mg (0.05 mmol), and the polymerization time was 30 hours. The bonding portion was synthesized in the same manner as Example 1 except that the obtained silicone polymers of 1 g (21 µmol) were used. The electrophoresis dispersion liquid was adjusted and evaluated in the same manner as Example 1 by using the obtained block copolymers.

Example 12

The dispersion portion was synthesized in the same manner as Example 11 except that silicone macromonomers with the molecular weight of 5,000 ("Silaplane FM-0721" manufactured by JNC corporation) of 10 g (1 mmol) were used. The bonding portion was synthesized in the same manner as Example 11 except that the obtained silicone polymers of 1 g (21 µmol) were used. The electrophoresis dispersion liquid was adjusted and evaluated in the same manner as Example 1 by using the obtained block copolymers.

Example 13

The dispersion portion was synthesized in the same manner as Example 11 except that silicone macromonomers with the molecular weight of 10,000 ("Silaplane FM-0725" manufactured by JNC corporation) of 10 g (2 mmol) were used. The bonding portion was synthesized in the same manner as Example 11 except that the obtained silicone polymers of 1 g (20 µmol) were used. The electrophoresis dispersion liquid was adjusted and evaluated in the same manner as Example 1 by using the obtained block copolymers.

Example 14

The dispersion portion was synthesized in the same manner as Example 11 except that silicone macromonomers with the molecular weight of 5,000 ("Silaplane FM-0721" manufactured by JNC corporation) of 5 g (1 mmol) and silicone macromonomers with the molecular weight of 10,000 ("Silaplane FM-0725" manufactured by JNC corporation) of 5 g (0.5 mmol) were mixed to synthesize the silicone polymers. The bonding portion was synthesized in the same manner as Example 11 except that the obtained silicone polymers of 1 g (18 µmol) were used. The electrophoresis dispersion liquid was adjusted and evaluated in the same manner as Example 1 by using the obtained block copolymers.

Example 15

Silicone macromonomers with molecular weight of 5,000 ("Silaplane FM-0721" manufactured by JNC corporation) of 6 g (1.2 mmol), 2-cyano-2-propyl benzodithioate of 45 mg (0.2 mmol), azobisisobutyronitrile of 33 mg (0.2 mmol), and ethyl acetate were added to a flask, were heated and stirred for 10 hours, and the silicone macromonomers were polymerized. Silicone macromonomers with molecular weight of 1,000 ("Silaplane FM-0711" manufactured by JNC corporation) of 4 g (4 mmol), were added to this flask, polymerized for 12 hours, and refined in the same manner as in Example 1 to synthesize the dispersion portion. The bonding portion was synthesized in the same manner as in Example 1 except that the obtained silicone polymers of 1 g (19 µmol) were used. The electrophoresis dispersion liquid was adjusted and evaluated in the same manner as Example 1 by using the obtained block copolymers.

Example 16

Silicone macromonomers with molecular weight of 5,000 ("Silaplane FM-0721" manufactured by JNC corporation) of 10 g (2 mmol), ethyl 2-bromoisobutyrate of 50 mg (0.26 mmol), and isopropanol were added to a flask, and the monomer solution was adjusted. To another flask, 2,2'-bipyridyl of 312 mg, copper chloride (I) of 80 mg, copper chloride (II) of 18 mg, isopropanol, and water were added and stirred, and catalyst solution was adjusted. The catalyst solution was added to the monomer solution, was heated and stirred for 30 hours, and was polymerized. The resultant was cooled down to the room temperature, the reaction ended, the solvent was removed, and dark brown silicone polymer reaction solution was obtained. The dispersion portion was synthesized by separating and refining the obtained reaction solution using methanol and water. The bonding portion was synthesized in the same manner as in Example 1 except that the obtained silicone polymers of 1 g (20 µmol) were used. The electrophoresis dispersion liquid was adjusted and evaluated in the same manner as Example 1 by using the obtained block copolymers.

Example 17

The dispersion portion was synthesized in the same manner as in Example 2 except that 2-phenyl-2-propyl benzodithioate of 54 mg (0.2 mmol) was used as a RAFT agent instead of 2-cyano-2-propyl benzodithioate. The bonding portion was synthesized in the same manner as in Example 1 except that the obtained silicone polymers of 1 g (24 µmol) were used. The electrophoresis dispersion liquid was adjusted and evaluated in the same manner as Example 1 by using the obtained block copolymers.

Example 18

The electrophoresis dispersion liquid was adjusted and evaluated in the same manner as Example 2 except that the refinement by the silica gel column is omitted.

Example 19

The electrophoresis dispersion liquid was adjusted and evaluated in the same manner as Example 2 except that the block copolymers were synthesized without isolating the dispersion portions. Specifically, silicone macromonomers ("Silaplane FM-0721" manufactured by JNC corporation) of 10 g (2 mmol), 2-cyano-2-propyl benzodithioate of 45 mg (0.2 mmol), azobisisobutyronitrile of 33 mg (0.2 mmol), and ethyl acetate were added to a flask, were heated and stirred for 20 hours, and the silicone macromonomers were polymerized. To this flask, 3-methacryloxypropyltriethoxysilane ("KBE-503" manufactured by Shin-Etsu Chemical Co., Ltd.) of 210 mg (0.7 mmol) were added, were heated and stirred for 20 hours, and the dispersion portion and the bonding portion were synthesized. The electrophoresis dispersion liquid was adjusted and evaluated in the same manner as Example 1 by using the obtained block copolymers.

Example 20

The electrophoresis dispersion liquid of Example 20 was adjusted by switching the synthesization order of the dispersion portion and the bonding portion. Specifically, 3-methacryloxypropyltriethoxysilane ("KBE-503" manufactured by Shin-Etsu Chemical Co., Ltd.) of 232 mg (0.8 mmol), 2-cyano-2-propyl benzodithioate of 45 mg (0.2 mmol), azobisisobutyronitrile of 33 mg (0.2 mmol), and ethyl acetate were added, were heated and stirred for 5 hours, and the polymerization reaction was performed. To this flask, specifically, silicone macromonomers with the molecular weight of 5,000 ("Silaplane FM-0721" manufactured by JNC corporation) of 10 g (2 mmol), were added, were heated and stirred for 20 hours, and the dispersion portion and the bonding portion were polymerized. The resultant was cooled down to the room temperature, the reaction ended, the solvent was removed, and block copolymer reaction solution was obtained. The obtained reaction solution was refined by silica gel column using a mixture solvent of hexane and chloroform, as a development solvent, and impurities were removed, and block copolymers were isolated. The electrophoresis dispersion liquid was adjusted and evaluated in the same manner as Example 1 by using the obtained block copolymers.

Example 21

The dispersion portions were synthesized in the same manner as Example 2. The bonding portion was synthesized in the same manner as in Example 1 by using the obtained silicone polymers of 1 g (18 µmol), 3-methacryloxypropyltriethoxysilane ("KBE-503" manufactured by Shin-Etsu Chemical Co., Ltd.) of 8 mg (27 µmol), and azobisisobutyronitrile of 2.4 mg (15 µmol). The electrophoresis dispersion liquid was adjusted and evaluated in the same manner as Example 1 by using the obtained block copolymers.

Example 22

The dispersion portions were synthesized in the same manner as Example 2. The bonding portion was synthesized in the same manner as in Example 1 by using the obtained silicone polymers of 1 g (18 µmol), 3-methacryloxypropyltriethoxysilane ("KBE-503" manufactured by Shin-Etsu Chemical Co., Ltd.) of 63 mg (216 µmol), and azobisisobutyronitrile of 2.4 mg (15 µmol). The electrophoresis dispersion liquid was adjusted and evaluated in the same manner as Example 1 by using the obtained block copolymers.

Example 23

The electrophoresis dispersion liquid was adjusted and evaluated in the same manner as Example 2 except that 3-methacryloxypropylmethyldiethoxysilane ("KBE-502" manufactured by Shin-Etsu Chemical Co., Ltd.) of 19 mg (72 µmol) was used in substitution for 3-methacryloxypropyltriethoxysilane at the time of synthesizing the bonding portion.

Example 24

The electrophoresis dispersion liquid was adjusted and evaluated in the same manner as Example 2 except that 3-methacryloxypropyltrimethoxysilane ("KBE-503" manufactured by Shin-Etsu Chemical Co., Ltd.) of 18 mg (72 µmol) was used in substitution for 3-methacryloxypropyltriethoxysilane at the time of synthesizing the bonding portion.

Example 25

The electrophoresis dispersion liquid was adjusted and evaluated in the same manner as Example 2 except that methacrylate-2-isocyanatoethyl of 11 mg (72 µmol) was used in substitution for 3-methacryloxypropyltriethoxysilane at the time of synthesizing the bonding portion.

Example 26

The dispersion portion and the bonding portion were synthesized in the same manner as Example 10. The electrophoresis dispersion liquid was adjusted and evaluated in the same manner as Example 1 except that a hydrocarbon-based solvent ("Isopar-G" manufactured by Exxon Mobil Corporation.) was used in substitution for the silicone oil.

Comparative Example 1

Silicone macromonomers with molecular weight of 5,000 ("Silaplane FM-0721" manufactured by JNC corporation) of 10 g (2 mmol), 3-methacryloxypropyltriethoxysilane ("KBE-503" manufactured by Shin-Etsu Chemical Co., Ltd.) of 210 mg (0.7 mmol), azobisisobutyronitrile of 33 mg (0.2 mmol), and ethyl acetate were added to a flask, were heated and stirred for 20 hours, and the silicone macromonomers were polymerized. The resultant was cooled down to the room temperature, the reaction ended, the solvent was removed, and a silicone polymer reaction solution was obtained. The obtained reaction solution was refined by silica gel column using a mixture solvent of hexane and chloroform, as a development solvent, and impurities were removed, and random copolymers were isolated. The electrophoresis dispersion liquid was adjusted and evaluated in the same manner as Example 1 except that the obtained random copolymers were used.

Comparative Example 2

The electrophoresis dispersion liquid was adjusted and evaluated in the same manner as Example 2 except that the synthesization of the bonding portion was omitted.

Reference Example 1

The dispersion portion was synthesized in the same manner as Example 1 except that the addition amount of azobisisobutyronitrile was 165 mg (1 mmol). The bonding portion was synthesized in the same manner as Example 1 except that the obtained silicone polymers of 1 g (16 µmol) were used. The electrophoresis dispersion liquid was adjusted and evaluated in the same manner as Example 1 by using the obtained block copolymers.

Reference Example 2

The dispersion portion was synthesized in the same manner as Example 2 except that the addition amount of azobisisobutyronitrile was 165 mg (1 mmol). The bonding portion was synthesized in the same manner as Example 1 except that the obtained silicone polymers of 1 g (15 µmol) were used. The electrophoresis dispersion liquid was adjusted and evaluated in the same manner as Example 1 by using the obtained block copolymers.

Reference Example 3

The dispersion portion was synthesized in the same manner as Example 3 except that the addition amount of azobisisobutyronitrile was 165 mg (1 mmol). The bonding portion was synthesized in the same manner as Example 1 except that the obtained silicone polymers of 1 g (15 µmol) were used. The electrophoresis dispersion liquid was adjusted and evaluated in the same manner as Example 1 by using the obtained block copolymers.

Weight average molecular weights (Mw), number average molecular weights (Mn), molecular weight distributions (Mw/Mn) of the dispersion portions, the number of bonding units in the bonding portions, and evaluation results are collectively presented in Table 1.

TABLE 1

| | Dispersion portion | | | | | Coupling portion | | Evaluation | | | |
| --- | --- | --- | --- | --- | --- | --- | --- | --- | --- | --- | --- |
| | Monomer | Molecular weight | Weight-average molecular weight | Number-average molecular weight | Molecular weight distribution | Monomer | Number of Units | Volume average particle diameter | White reflectance | Black reflectance | contrast |
| Example 1 | Silaplane FM-0711 | 1000 | 52000 | 46000 | 1.13 | KBE-503 | 3.8 | 342 | 44 | 4 | 11 |
| Example 2 | Silaplane FM-0721 | 5000 | 56000 | 50000 | 1.12 | | 4.0 | 330 | 48 | 3 | 16 |
| Example 3 | Silaplane FM-0725 | 10000 | 57000 | 51000 | 1.12 | | 4.0 | 335 | 45 | 3 | 15 |
| Example 4 | dimethyl silicone macromonomer | 500 | 48000 | 41000 | 1.17 | | 3.4 | 585 | 20 | 5 | 4 |
| Example 5 | dimethyl silicone macromonomer | 20000 | 58000 | 52000 | 1.12 | | 4.2 | 362 | 40 | 4 | 10 |
| Example 6 | Silaplane FM-0711 | 1000 | 97000 | 85000 | 1.14 | | 3.6 | 392 | 30 | 3 | 10 |
| Example 7 | Silaplane FM-0721 | 5000 | 100000 | 87000 | 1.15 | | 3.6 | 380 | 39 | 3 | 13 |
| Example 8 | Silaplane FM-0725 | 10000 | 99000 | 88000 | 1.12 | | 3.6 | 395 | 39 | 3 | 13 |
| Example 9 | AS-6 | 6000 | 56000 | 48000 | 1.17 | | 4.0 | 779 | 15 | 3 | 5 |
| Example 10 | N-lauryl methacrylate | 254 | 50000 | 42000 | 1.19 | | 3.6 | 621 | 18 | 3 | 6 |
| Example 11 | Silaplane FM-0711 | 1000 | 48000 | 44000 | 1.09 | | 3.4 | 328 | 45 | 3 | 15 |
| Example 12 | Silaplane FM-0721 | 5000 | 48000 | 46000 | 1.04 | | 3.4 | 310 | 60 | 3 | 20 |
| Example 13 | Silaplane FM-0725 | 10000 | 50000 | 48000 | 1.04 | | 3.6 | 330 | 48 | 3 | 16 |
| Example 14 | Silaplane FM-0721 Silaplane FM-0725 | 5000 10000 | 57000 | 49000 | 1.16 | | 4.0 | 333 | 48 | 3 | 16 |

TABLE 1-continued

| | Dispersion portion | | | | | Coupling portion | | Evaluation | | | |
| | | | Weight-average molecular weight | Number-average molecular weight | Molecular weight distribution | | Number of Units | Volume average particle diameter | White reflectance | Black reflectance | contrast |
| | Monomer | Molecular weight | | | | Monomer | | | | | |
|---|---|---|---|---|---|---|---|---|---|---|---|
| Example 15 | Silaplane FM-0721 | 5000 | 52000 | 44000 | 1.18 | | 3.8 | 317 | 51 | 3 | 17 |
| | Silaplane FM-0711 | 1000 | | | | | | | | | |
| Example 16 | Silaplane FM-0721 | 5000 | 51000 | 43000 | 1.19 | | 3.6 | 395 | 27 | 3 | 9 |
| Example 17 | | | 41000 | 36000 | 1.14 | | 3.0 | 336 | 42 | 3 | 14 |
| Example 18 | | | 55000 | 50000 | 1.10 | | 4.0 | 361 | 36 | 3 | 12 |
| Example 19 | | | 56000 | 50000 | 1.12 | | 3.5 | 411 | 33 | 3 | 11 |
| Example 20 | | | 56000 | 50000 | 1.12 | | 4.0 | 433 | 36 | 4 | 9 |
| Example 21 | | | 55000 | 50000 | 1.10 | | 1.5 | 617 | 32 | 4 | 8 |
| Example 22 | | | 55000 | 50000 | 1.10 | | 12.0 | 573 | 40 | 4 | 10 |
| Example 23 | | | 55000 | 50000 | 1.10 | KBE-502 | 4.0 | 336 | 48 | 3 | 16 |
| Example 24 | | | 55000 | 50000 | 1.10 | KBM-503 | 4.0 | 370 | 42 | 3 | 14 |
| Example 25 | | | 55000 | 50000 | 1.10 | methacrylate-2-isocyanatoethyl | 4.0 | 707 | 32 | 8 | 4 |
| Example 26 | N-lauryl methacrylate | 254 | 50000 | 42000 | 1.19 | KBE-503 | 3.6 | 327 | 51 | 3 | 17 |
| Comparative Example 1 | Silaplane FM-0721 | 5000 | 95000 | 59000 | 1.61 | | 3.5 | 504 | 32 | 4 | 8 |
| Comparative Example 2 | | | 55000 | 50000 | 1.10 | — | — | 846 | 20 | 10 | 2 |
| Reference Example 1 | Silaplane FM-0711 | 1000 | 62000 | 49000 | 1.27 | KBE-503 | 4.5 | 351 | 40 | 4 | 10 |
| Reference Example 2 | Silaplane FM-0721 | 5000 | 66000 | 50000 | 1.32 | | 4.8 | 340 | 42 | 3 | 14 |
| Reference Example 3 | Silaplane FM-0725 | 10000 | 68000 | 55000 | 1.24 | | 4.8 | 346 | 48 | 4 | 12 |

The molecular weight distributions of the dispersion portions in Example 19 were measured by extracting a portion of the synthesized silicone polymers. In addition, the molecular weight distribution of the dispersion portions in Example 20 was approximately estimated from the measurement results of the bonding portion and the block copolymer, respectively. The molecular weight distribution in Comparative Example 1 is a reference value.

The entire disclosure of Japanese Patent Application No. 2014-028865, filed Feb. 18, 2014 is expressly incorporated by reference herein.

What is claimed is:

1. A method of manufacturing electrophoresis particles including particles including first functional groups on surfaces and block copolymers bonded to the particles, the method comprising:
    obtaining the block copolymers in which dispersion portions formed by polymerizing first monomers including portions contributing to dispersibility in a dispersion medium and bonding portions formed by polymerizing second monomers including second functional groups having reactivity with the first functional group are bonded by living polymerization; and
    bonding the bonding portions to the particles by reacting the first functional groups and the second functional groups so that the block copolymers are bonded to the particles,
    wherein in the dispersion portions, molecular weights of the first monomers on base end portion sides that are bonded to the bonding portions are smaller than molecular weights of the first monomers on distal end portion sides.

2. The method of manufacturing electrophoresis particles according to claim 1,
    wherein in the obtaining of the block copolymers, after the first monomers are polymerized, the second monomers are polymerized, to obtain the block copolymers.

3. The method of manufacturing electrophoresis particles according to claim 1,
    wherein in the obtaining of the block copolymers, after the second monomers are polymerized, the block copolymers are obtained by polymerizing the first monomers.

4. The method of manufacturing electrophoresis particles according to claim 1,
    wherein the living polymerization is living radical polymerization.

5. The method of manufacturing electrophoresis particles according to claim 4,
    wherein the living radical polymerization is reversible addition fragmentation chain-type transfer polymerization.

6. The method of manufacturing electrophoresis particles according to claim 2,
    wherein before the second monomers are polymerized, the dispersion portions are isolated and refined.

7. Electrophoresis particles comprising:
    particles including first functional groups on surfaces; and
    block copolymers bonded to the particles,
    wherein
        the block copolymers include dispersion portions formed by polymerizing first monomers including portions contributing to dispersibility in a dispersion medium and bonding portions formed by polymerizing second monomers including second functional groups having reactivity with the first functional group and bonded to the dispersion portions,
        the bonding portions are bonded to the particles in a plurality of portions by the reaction of the first functional groups and the second functional groups, the plurality of block copolymers have molecular weight distributions with respect to the dispersion portions equal to or less than 1.2, and in the dispersion portions, molecular weights of the first monomers on base end portion sides that are bonded to the bonding portions are smaller than molecular weights of the first monomers on distal end portion sides.

8. The electrophoresis particles according to claim 7, wherein weight average molecular weights of the dispersion portions are in the range of 20,000 to 100,000.

9. The electrophoresis particles according to claim 7, wherein the first monomers are silicone macromonomers expressed by Formula (I) below,

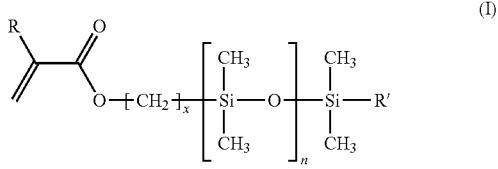

[in the formula, R is a hydrogen atom or methyl group, R' is a hydrogen atom or an alkyl group having 1 to 4 carbons, n is an integer equal to or greater than 0, and x is an integer from 1 to 3].

10. The electrophoresis particles according to claim 9, wherein molecular weights of the silicone macromonomers are in the range of 1,000 to 10,000.

11. The electrophoresis particles according to claim 7, wherein the bonding portions each are formed by polymerizing the second monomers in the number of 2 to 8.

12. An electrophoresis dispersion liquid comprising:
electrophoresis particles manufactured in the method of manufacturing electrophoresis particles according to claim 1, or the electrophoresis particles according to claim 7.

13. An electrophoresis dispersion liquid comprising:
electrophoresis particles manufactured in the method of manufacturing electrophoresis particles according to claim 2, or the electrophoresis particles according to claim 7.

14. An electrophoresis dispersion liquid comprising:
electrophoresis particles manufactured in the method of manufacturing electrophoresis particles according to claim 3, or the electrophoresis particles according to claim 7.

15. An electrophoresis dispersion liquid comprising:
electrophoresis particles manufactured in the method of manufacturing electrophoresis particles according to claim 4, or the electrophoresis particles according to claim 7.

16. An electrophoresis dispersion liquid comprising:
electrophoresis particles manufactured in the method of manufacturing electrophoresis particles according to claim 5, or the electrophoresis particles according to claim 7.

17. An electrophoresis sheet comprising:
a substrate; and
a plurality of structures that are positioned on an upper side of the substrate and store the electrophoresis dispersion liquid according to claim 12.

18. An electrophoresis device comprising:
the electrophoresis sheet according to claim 17.

19. An electronic apparatus comprising:
the electrophoresis device according to claim 18.

* * * * *